United States Patent
Miyagawa

(10) Patent No.: US 9,540,567 B2
(45) Date of Patent: Jan. 10, 2017

(54) POLYMERIZABLE LIQUID CRYSTAL COMPOSITION AND OPTICALLY ANISOTROPIC BODY

(71) Applicants: JNC CORPORATION, Tokyo (JP); JNC PETROCHEMICAL CORPORATION, Tokyo (JP)

(72) Inventor: Nagahisa Miyagawa, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 15/084,493

(22) Filed: Mar. 30, 2016

(65) Prior Publication Data

US 2016/0289562 A1    Oct. 6, 2016

(30) Foreign Application Priority Data

Mar. 31, 2015  (JP) ................. 2015-071977

(51) Int. Cl.
C09K 19/52 (2006.01)
C09K 19/04 (2006.01)

(52) U.S. Cl.
CPC ....... *C09K 19/52* (2013.01); *C09K 2019/0448* (2013.01); *C09K 2019/525* (2013.01)

(58) Field of Classification Search
CPC ............... C09K 19/0448; C09K 19/52; C09K 2019/525
See application file for complete search history.

(56) References Cited

U.S. PATENT DOCUMENTS

| 2012/0114907 A1* | 5/2012 | Eckert | C09K 19/2007 428/156 |
| 2013/0123456 A1* | 5/2013 | Caillol | C07C 319/18 528/74.5 |
| 2015/0344781 A1* | 12/2015 | Chen | C09K 19/062 252/299.64 |

FOREIGN PATENT DOCUMENTS

| GB | 2529349 | 2/2016 |
| JP | 2004-099861 | 4/2004 |
| JP | 2009-184974 | 8/2009 |
| JP | 2011-068833 | 4/2011 |
| WO | 2014192655 | 12/2014 |

* cited by examiner

*Primary Examiner* — Shean C Wu
(74) *Attorney, Agent, or Firm* — Jianq Chyun IP Office

(57) ABSTRACT

A polymerizable liquid crystal composition contains a polymerizable liquid crystal compound having good solubility, and is well-aligned without dissolving a substrate or a base material when coated onto the substrate. Moreover, the polymerizable liquid crystal composition causes no coating film unevenness during coating so that a smooth optically anisotropic body can be obtained. The polymerizable liquid crystal composition contains at least one kind of polymerizable liquid crystal compound having one or more polymerizable functional groups in one molecule, and a solvent, wherein the solvent includes a diacetate solvent and a ketone solvent.

20 Claims, No Drawings

POLYMERIZABLE LIQUID CRYSTAL COMPOSITION AND OPTICALLY ANISOTROPIC BODY

CROSS-REFERENCE TO RELATED APPLICATIONS

This application claims the priority benefit of Japan application serial no. 2015-071977, filed on Mar. 31, 2015. The entirety of the above-mentioned patent application is hereby incorporated by reference herein and made a part of this specification.

FIELD OF THE INVENTION

The invention relates to a polymerizable liquid crystal composition useful for producing an optical material such as a phase difference film, and to an optically anisotropic body produced from the polymerizable liquid crystal composition. More specifically, the invention relates to a polymerizable liquid crystal composition that is well-aligned with no cissing or unevenness occurring during coating of the polymerizable liquid crystal composition, and to an optically anisotropic body made from the polymerizable liquid crystal composition.

DESCRIPTION OF THE RELATED ART

In a display apparatus such as a liquid crystal display (LCD) device or the like, an optically anisotropic body is used to improve the viewing angle dependency of contrast or hue and to increase the luminance. The optically anisotropic body used is applied as, e.g., a phase difference film, a phase difference patterning film, or a horizontally-aligned liquid crystal film, to various LCD devices.

It is known (e.g., in Patent Document 1) that an optically anisotropic body is obtained by coating a polymerizable liquid crystal composition on a substrate, and heating the same that has been aligned by an alignment film or the like, or irradiating an active energy ray thereon so as to align and fix the same. However, as it is difficult to coat the polymerizable liquid crystal composition uniformly without causing any defects, or to align the polymerizable liquid crystal composition without causing any alignment defects, the productivity is insufficient.

As a polymerizable liquid crystal composition is used, to facilitate printing or coating (hereinafter simply "coating") thereof, it is necessary to use a solvent in the polymerizable liquid crystal composition. However, when a solvent is used, the solvent resistance of the substrate as a coated object or the solubility of a polymerizable liquid crystal compound becomes a problem, and unevenness or cissing easily occurs in the coating film. Therefore, improvement methods have been proposed in Patent Documents 2 to 4. Nonetheless, further improvement has been desired.

PRIOR-ART DOCUMENTS

Patent Documents

Patent Document 1: JP 2009-184974 A
Patent Document 2: WO 2014/192655 A1
Patent Document 3: JP 2004-099861 A
Patent Document 4: JP 2011-068833 A

SUMMARY OF THE INVENTION

In view of the aforementioned problems, the invention provides a polymerizable liquid crystal composition, which contains a polymerizable liquid crystal compound having good solubility, and, when coated onto a substrate, is well-aligned without dissolving the substrate or a base material. Moreover, the polymerizable liquid crystal composition causes no coating film unevenness during coating so that a smooth optically anisotropic body can be obtained.

As a result of earnest studies of combinations of various polymerizable liquid crystal compositions in order to achieve the aforementioned purposes, it was found that by containing a specific organic solvent in the polymerizable liquid crystal composition, the solubility of the polymerizable liquid crystal compound is good, and an optically anisotropic body having good alignment properties without unevenness or cissing occurring during coating is obtained, and the invention is thereby accomplished.

The invention is summarized as the following Items [1] to [17].

Item [1] is a polymerizable liquid crystal composition containing at least one kind of polymerizable liquid crystal compound having one or more polymerizable functional groups in one molecule, and a solvent, wherein the solvent includes a diacetate solvent and a ketone solvent.

Item [2] is the polymerizable liquid crystal composition of item [1] in which the diacetate solvent is contained in an amount of 5 wt % to 50 wt % relative to the total amount of the solvent.

Item [3] is the polymerizable liquid crystal composition of item [1] or [2] in which the diacetate solvent includes at least one selected from the group consisting of propylene glycol diacetate, 1,4-butanediol diacetate and 1,3-butylene glycol diacetate.

Item [4] is the polymerizable liquid crystal composition of any one of items [1] to [3] in which the diacetate solvent includes at least one selected from the group consisting of propylene glycol diacetate and 1,4-butanediol diacetate.

Item [5] is the polymerizable liquid crystal composition of any one of items [1] to [4] in which the ketone solvent is contained in an amount of 50 wt % to 95 wt % relative to the total amount of the solvent.

Item [6] is the polymerizable liquid crystal composition of any one of items [1] to [5] in which the ketone solvent comprises cyclopentanone.

Item [7] is the polymerizable liquid crystal composition of any one of items [1] to [6] which further contains a monoacetate solvent in an amount of 30 wt % or less relative to the total amount of the solvent.

Item [8] is the polymerizable liquid crystal composition of item [7] in which the monoacetate solvent comprises propylene glycol monometyl ether acetate.

Item [9] is the polymerizable liquid crystal composition of any one of items [1] to [8] which further contains an ether solvent in an amount of 10 wt % or less relative to the total amount of the solvent.

Item [10] is the polymerizable liquid crystal composition of item [9] in which the ether solvent comprises diethylene glycol methyl ethyl ether.

Item [11] is the polymerizable liquid crystal composition of any one of items [1] to [10] which further contains a solvent other than the diacetate solvent, the ketone solvent, the monoacetate solvent and the ether solvent, in an amount of 5 wt % or less relative to the total amount of the solvent in the polymerizable liquid crystal composition.

Item [12] is the polymerizable liquid crystal composition of item [11] in which a total content of an alcohol solvent and a hydrocarbon solvent is 5 wt % or less relative to the total amount of the solvent in the polymerizable liquid crystal composition.

Item [13] is an optically anisotropic body obtained by curing the polymerizable liquid crystal composition of any one of items [1] to [12] in an aligned state.

Item [14] is an optically anisotropic body obtained by curing the polymerizable liquid crystal composition of any one of items [1] to [12] in a horizontally aligned state.

Item [15] is an optically anisotropic body obtained by curing the polymerizable liquid crystal composition of any one of items [1] to [12] in a twistedly aligned state.

Item [16] is an optically anisotropic body obtained by curing the polymerizable liquid crystal composition of any one of items [1] to [12] in a vertically aligned state.

Item [17] is a laminated optically anisotropic body obtained by laminating a plurality of the optically anisotropic body of any one of items [13] to [16].

The polymerizable liquid crystal composition of the invention has good solubility. By using the polymerizable liquid crystal composition, cissing or unevenness does not occur during coating, and a well-aligned optically anisotropic body can be obtained.

DESCRIPTION OF THE EMBODIMENTS

The invention is hereinafter explained in detail with embodiments and illustrations, etc. However, the invention is not limited to the following embodiments and illustrations, etc., and can be carried out by making optional changes without departing from the gist of the invention.

The terms in this specification are defined as follows.

The term "liquid crystal phase" is a generic term for nematic phase, smectic phase and cholesteric phase, etc.

"Liquid crystallinity" includes the property of a compound having a liquid crystal phase and the property of a compound lacking a liquid crystal phase but being useful as a component of a liquid crystal composition.

"Liquid crystal composition" is a generic term for a mixture having a liquid crystal phase and a material obtained by adding a solvent in the mixture.

"Liquid crystal compound" is a generic term for a compound having a liquid crystal phase and a compound having no liquid crystal phase but being useful as a component of a liquid crystal composition.

"Polymerizability" means a capability to polymerize a monomer by means of light, heat, catalysts, etc. so as to provide a compound having a larger molecular weight.

"Polymerizable group" means a functional group having polymerizability.

"Polymerizable compound" means a compound having a polymerizable group.

"Polymerizable liquid crystal compound" means a liquid crystal compound having a polymerizable group.

"Polymerizable liquid crystal composition" means a liquid crystal composition containing a polymerizable compound.

"Monofunctional" means having one polymerizable group in one molecule.

"Monofunctional compound" means a compound having one polymerizable group in one molecule.

"Multifunctional" means having a plurality of polymerizable groups in one molecule. "Multifunctional compound" means a compound having a plurality of polymerizable groups in one molecule.

A compound represented by formula (1) is sometimes expressed as compound (1). Compounds represented by other formulae are sometimes named in accordance with the same simplification rule.

The term "at least one" used in explaining a compound structure not only means at least one position but also describes the number. For example, the expression "at least one A is optionally replaced by B, C or D" not only means that at least one A may be replaced by B, at least one A may be replaced by C or at least one A may be replaced by D, but also means that a plurality of A's may be replaced by at least two of B, C and D. However, the definition of "at least one —$CH_2$— is optionally replaced by —O—" does not include a replacement that produces a linking group —O—O— as a result. In addition, when at least one —$CH_2$— is replaced by —O—, the number of carbons does not exceed a range described herein.

For example, $R_1$ in later-described formula (S) is alkylene having 1 to 20 carbons, and at least one —$CH_2$— in this alkylene is optionally replaced by —O— or the like. However, in this case, the number of carbons in the alkylene that contains the replacement by —O— or the like does not exceed 20. This rule also applies to other definitions.

When a chemical formula is described as follows, the straight line from A to B means a bond, a hydrogen in A is replaced by the group B, and the position thereof is arbitrary. X represents the number of the group B for the replacement. When X is 0, it means that B does not exist or no replacement has been made.

[1. Polymerizable Liquid Crystal Composition]

The polymerizable liquid crystal composition of the invention is a composition containing, as main components, at least one "polymerizable liquid crystal compound" having one or more polymerizable groups in one molecule, a solvent having a diacetate structure that is suitably called "diacetate solvent" hereinafter, and a solvent having a ketone structure that is suitably called "ketone solvent" hereinafter.

[1-1. Polymerizable Liquid Crystal Compound]

The polymerizable liquid crystal compound has one or more polymerizable groups in one molecule. The polymerizable group is a group that polymerizes the polymerizable liquid crystal compound under a suitable condition. Since the polymerizable liquid crystal compound has one or more polymerizable groups, when the polymerizable liquid crystal composition is formed into a film and cured, a cured product can be obtained by polymerizing the polymerizable liquid crystal composition.

Examples of the above polymerizable group include carboxyl group, (meth)acrylic group, epoxy group, thioepoxy group, mercapto group, isocyanate group, isothiocyanate group, oxetane group, thietanyl group, aziridinyl group, pyrrole group, vinyl group, allyl group, fumarate group, cinnamoyl group, oxazoline group, hydroxyl group, alkoxysilyl group, and amino group, etc. Moreover, "(meth)acrylic group" refers to both acrylic group and methacrylic group. In addition, one kind or two or more kinds of polymerizable functional groups may be contained in one molecule. However, when producing a film by photo-curing that is generally used, in view of high curability, solubility in a solvent, and ease of handling, etc., acrylic group or methacrylic group is preferably selected.

The polymerizable liquid crystal compound is preferably selected from compounds represented by the following formulae (M1), (M2) and (M3).

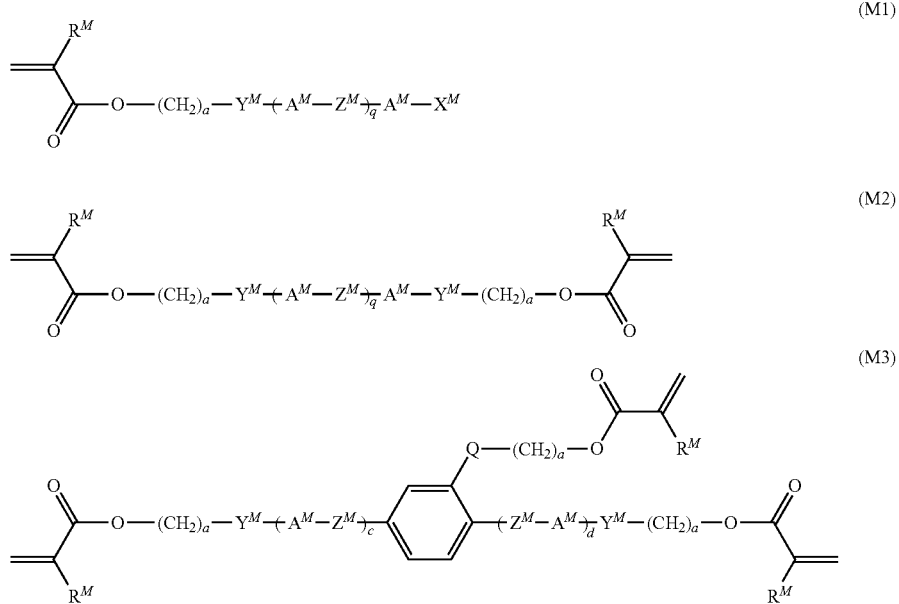

(M1)

(M2)

(M3)

In formulae (M1), (M2) and (M3), each $A^M$ is independently any divalent group selected from 1,4-phenylene, 1,4-cyclohexylene, 1,4-cyclohexenylene, pyridine-2,5-diyl, 1,3-dioxane-2,5-diyl, naphthalene-2,6-diyl and fluorene-2,7-diyl, wherein at least one hydrogen in the divalent group is optionally replaced by fluorine, chlorine, cyano, hydroxy, formyl, trifluoroacetyl, difluoromethyl, trifluoromethyl, alkyl having 1 to 5 carbons, alkoxy having 1 to 5 carbons, alkyl ester having 1 to 5 carbons, or alkanoyl having 1 to 5 carbons; each $Z^M$ is independently a single bond, —OCH$_2$—, —CH$_2$O—, —COO—, —OCO—, —COS—, —SCO—, —OCOO—, —CONH—, —NHCO—, —CF$_2$O—, —OCF$_2$—, —CH$_2$CH$_2$—, —CF$_2$CF$_2$—, —CH=CHCOO—, —OCOCH=CH—, —CH$_2$CH$_2$COO—, —OCOCH$_2$CH$_2$—, —CH=CH—, —CH=N—, —N=CCH$_3$—, —CCH$_3$=N—, —N=N—, or —C≡C—; $X^M$ is hydrogen, fluorine, chlorine, trifluoromethyl, trifluoromethoxy, cyano, alkyl having 1 to 20 carbons, alkenyl having 1 to 20 carbons, alkoxy having 1 to 20 carbons, or alkyl ester having 1 to 20 carbons; q is an integer of 1 to 4; c and d are each an integer of 0 to 3, and $1 \leq c+d \leq 4$; a is an integer of 0 to 20; $R^M$ is hydrogen or methyl; $Y^M$ is a single bond, —O—, —COO—, —OCO—, or —OCOO—; and Q is a single bond, —O—, —COO—, —OCO—, or —OCOO—. Herein, when q, c, or d is 2 or greater, $A^M$ or $Z^M$ may be different at each repetition thereof.

In addition, regarding the compounds represented by the above formulae (M1), (M2) and (M3), the compound represented by formula (M1) or (M2) is more preferably used.

The compound represented by formula (M1) is a monofunctional polymerizable liquid crystal compound, and can easily control the liquid crystal temperature range, optical characteristics and alignment properties of the polymerizable liquid crystal composition. In addition, by increasing the amount added, homeotropic alignment can be more easily obtained. The compound represented by formula (M2) is a bifunctional polymerizable liquid crystal compound. Because of its three-dimensional structure, the polymer thereof is harder as compared to the polymer of the compound represented by formula (M1) that has one polymerizable group. The compound represented by formula (M3) is a trifunctional polymerizable liquid crystal compound. The polymer thereof is capable of forming a stronger network, and is even harder as compared to the polymer of the compound having one or two polymerizable groups. Hereinafter, the compounds represented by formulae (M1), (M2) and (M3) and compounds derived therefrom are sometimes collectively referred to as formula (M).

Preferred examples of the compound represented by formula (M1) are shown below.

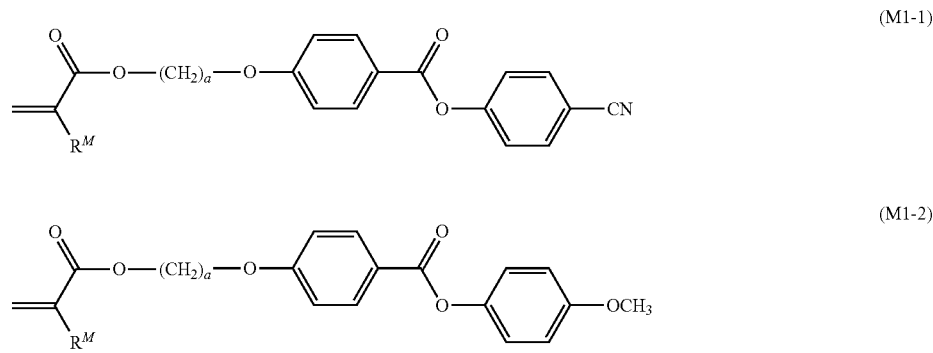

(M1-1)

(M1-2)

-continued
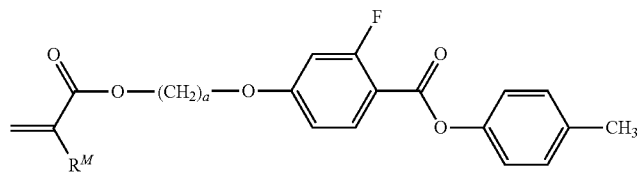
(M1-3)
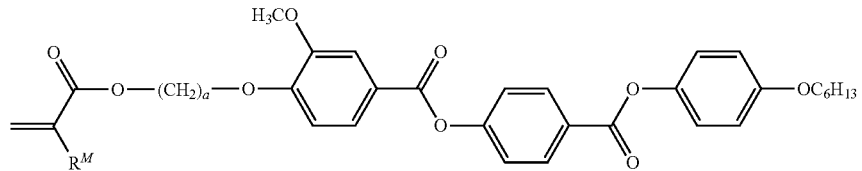
(M1-4)
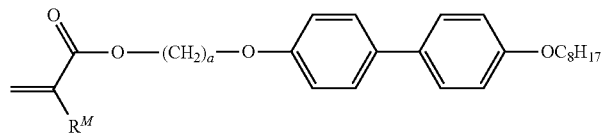
(M1-5)
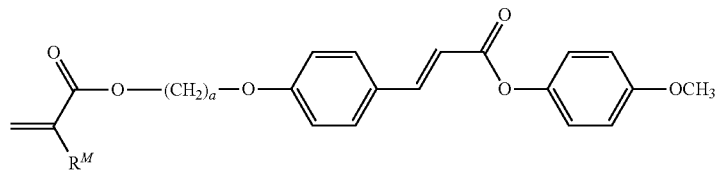
(M1-6)
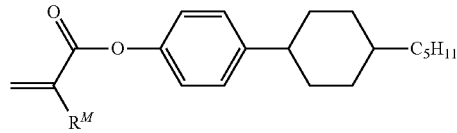
(M1-7)
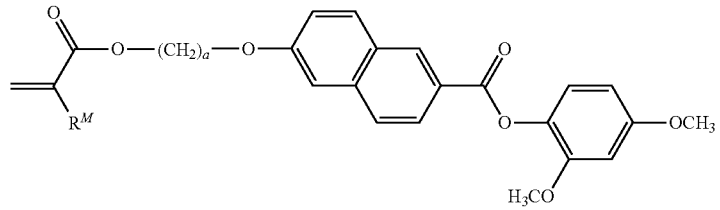
(M1-8)
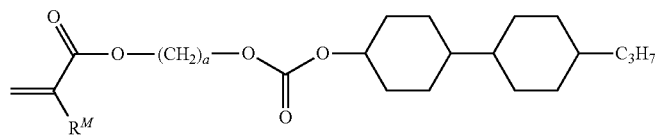
(M1-9)
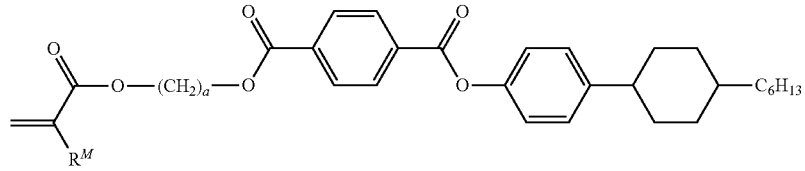
(M1-10)
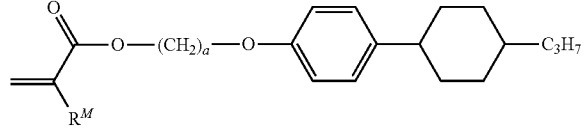
(M1-11)

(M1-12)
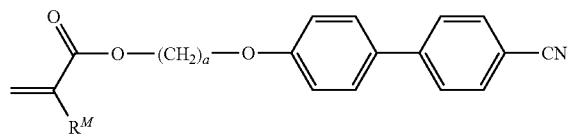
(M1-13)
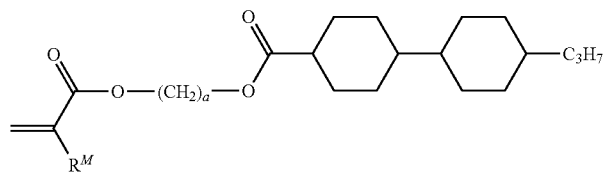
(M1-14)
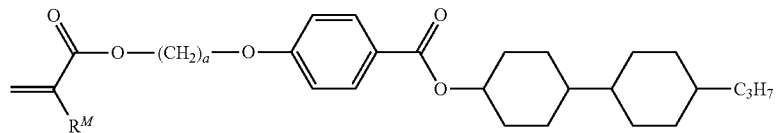
(M1-15)
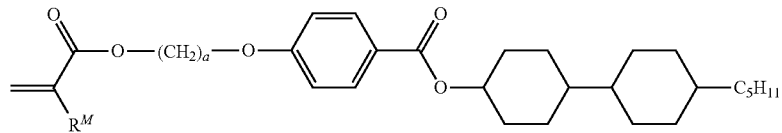
(M1-16)
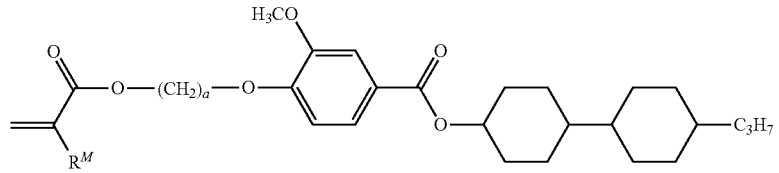
(M1-17)
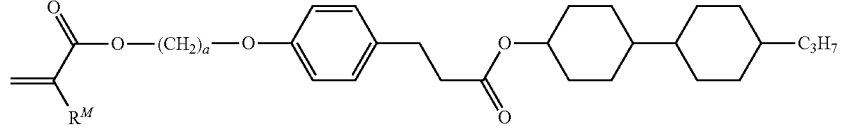
(M1-18)
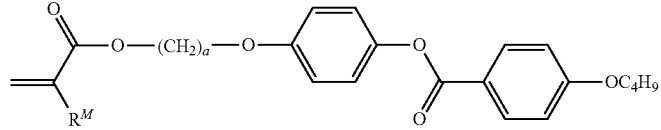
(M1-19)
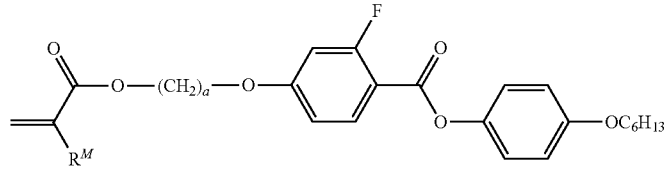
(M1-20)
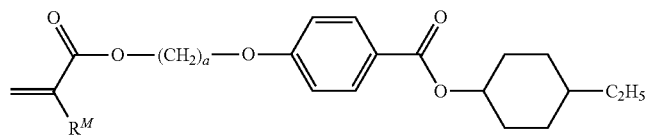
(M1-21)
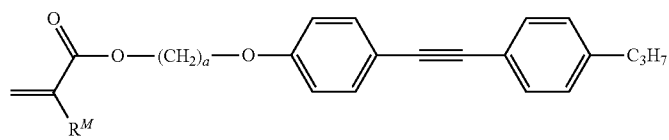

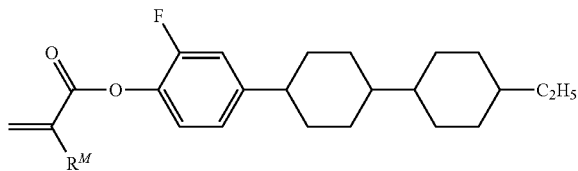
(M1-22)
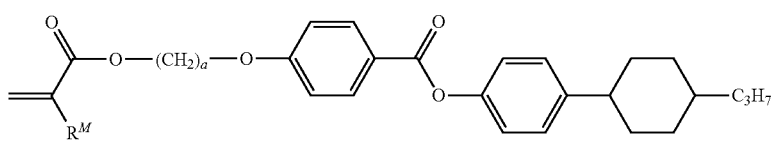
(M1-23)
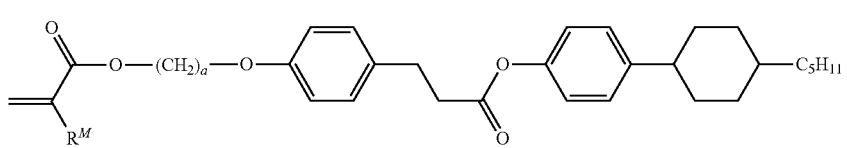
(M1-24)
In formulae (M1-1) to (M1-24), each $R^M$ is independently hydrogen or methyl, and each a is independently an integer of 1 to 12.
Preferred examples of the compound represented by formula (M2) are shown below.
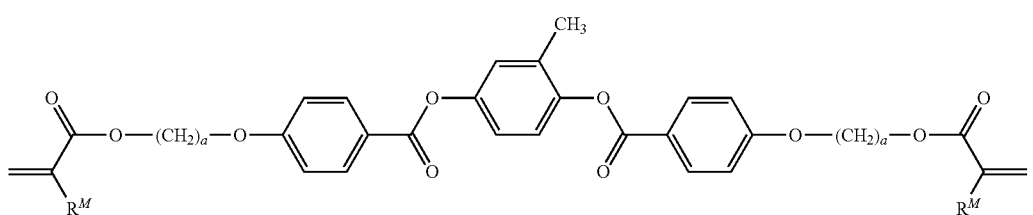
(M2-1)
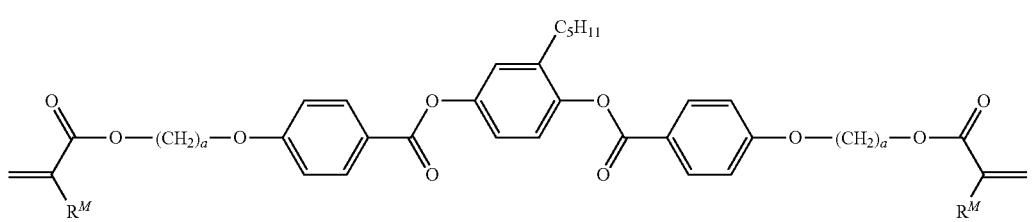
(M2-2)
(M2-3)
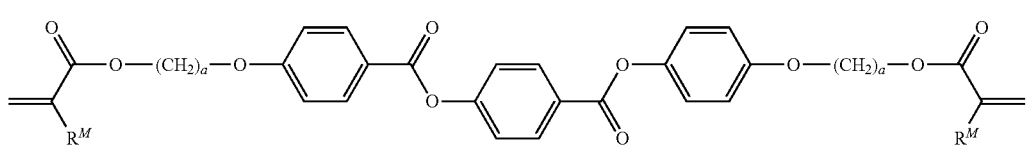
(M2-4)

-continued
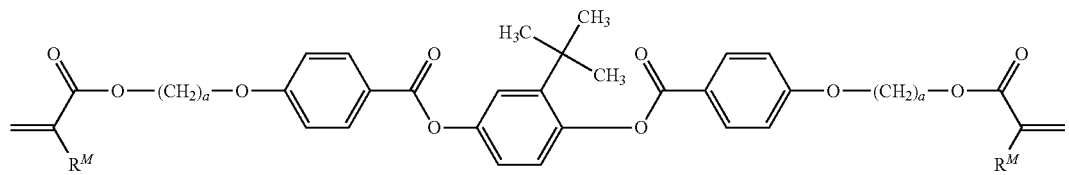
(M2-5)
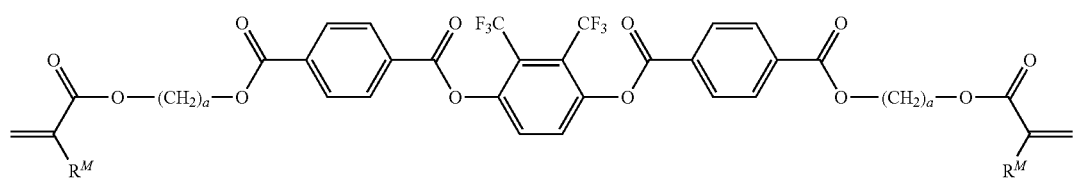
(M2-6)
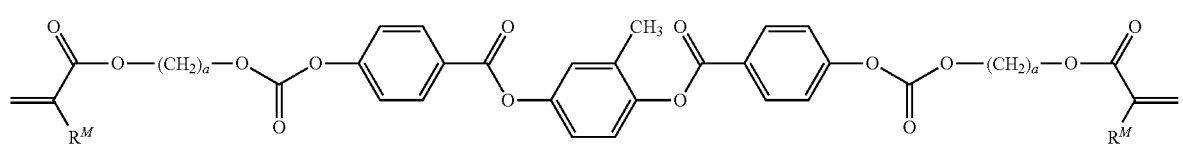
(M2-7)
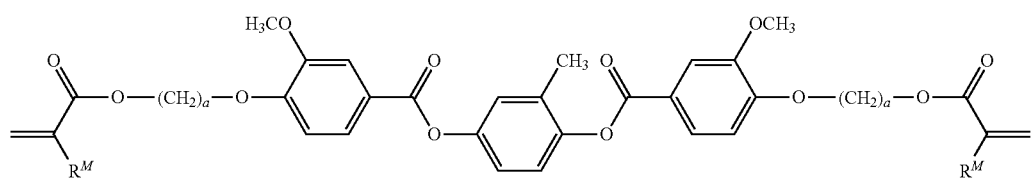
(M2-8)
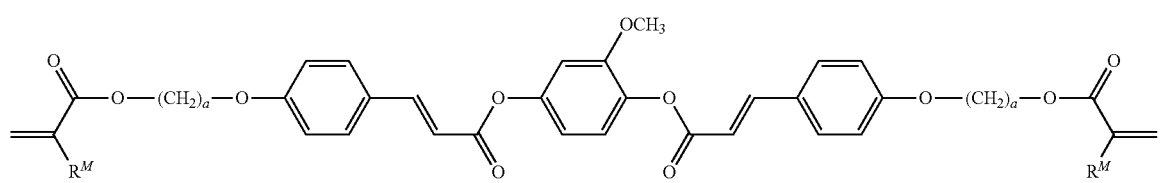
(M2-9)
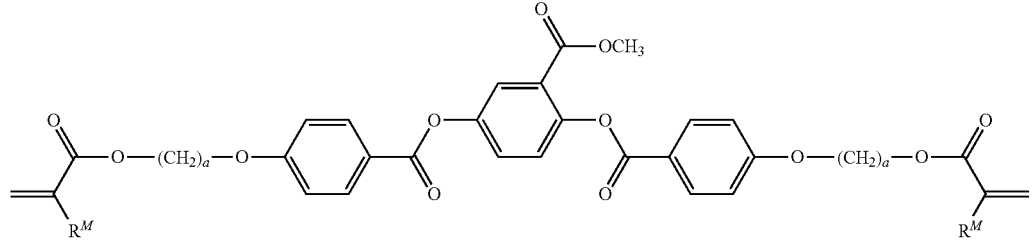
(M2-10)
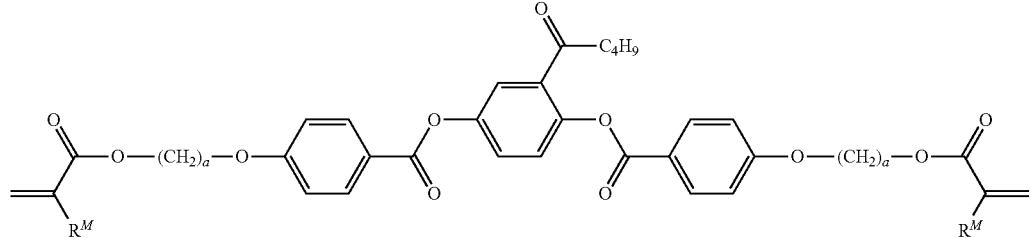
(M2-11)
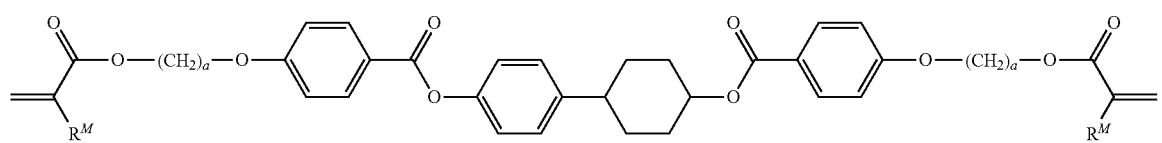
(M2-12)

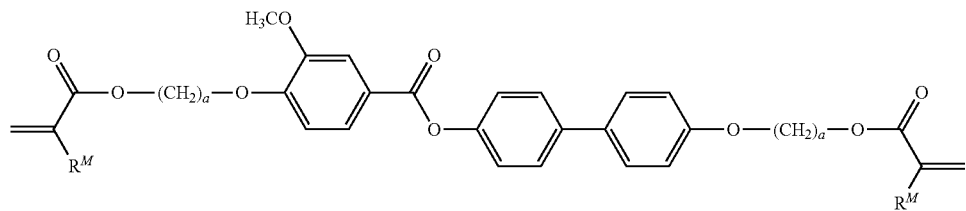
(M2-13)
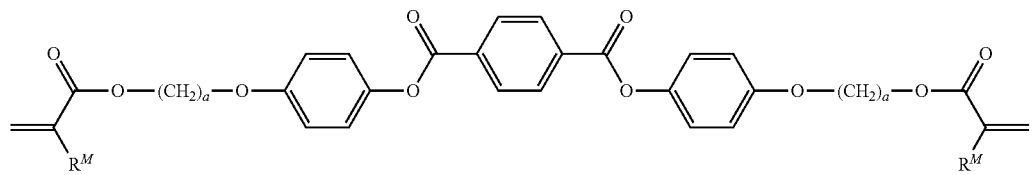
(M2-14)
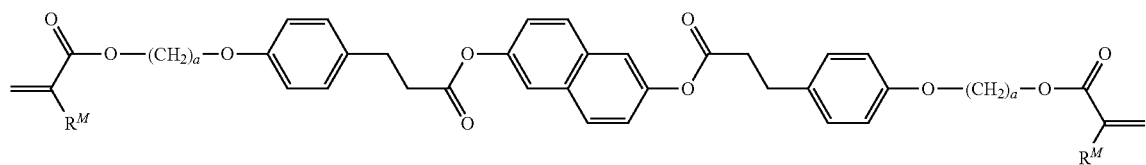
(M2-15)
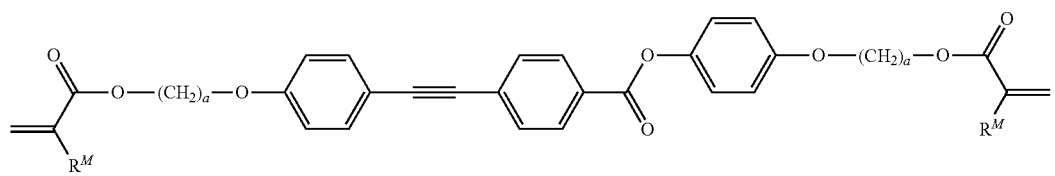
(M2-16)
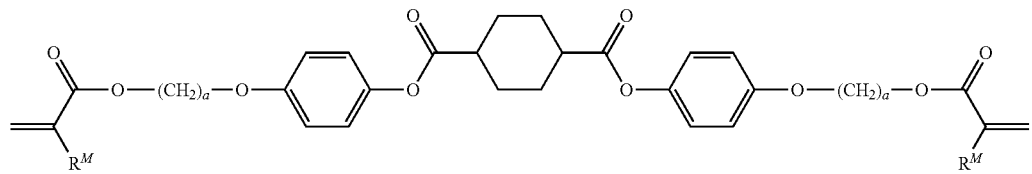
(M2-17)
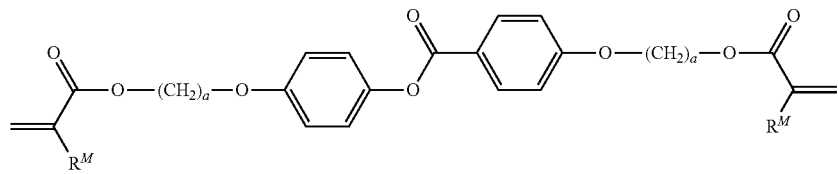
(M2-18)
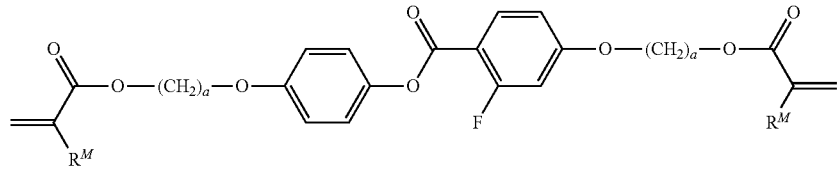
(M2-19)
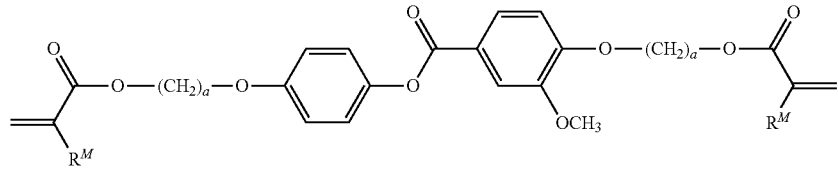
(M2-20)

-continued
(M2-21)
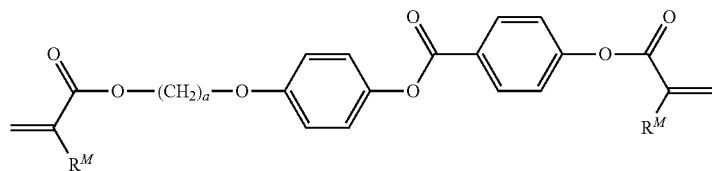
(M2-22)
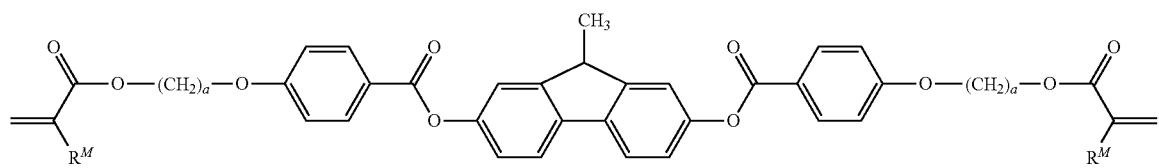
(M2-23)
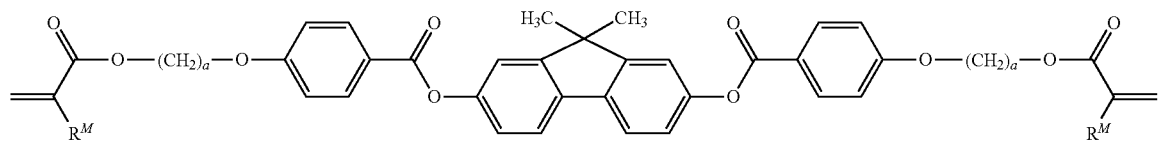
(M2-24)
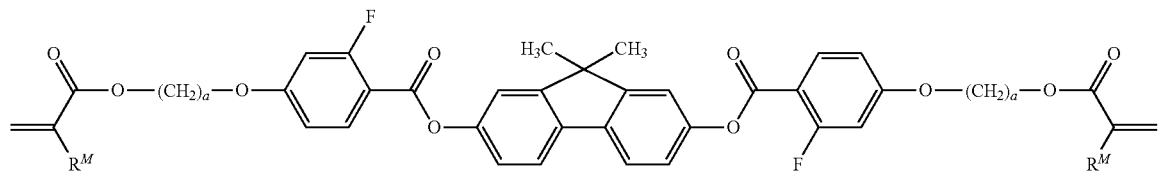
(M2-25)
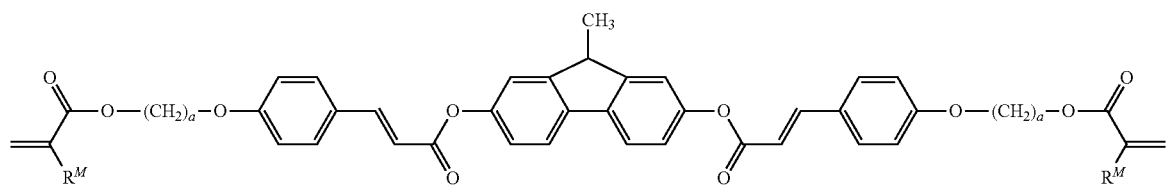
(M2-26)
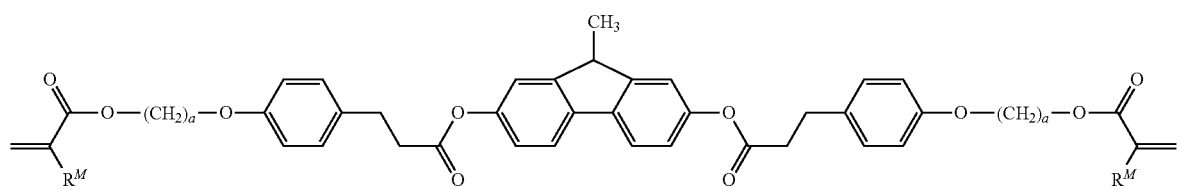
(M2-27)
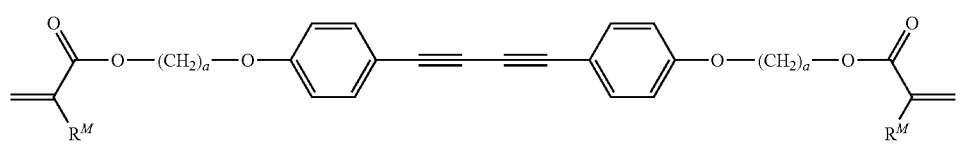
(M2-28)
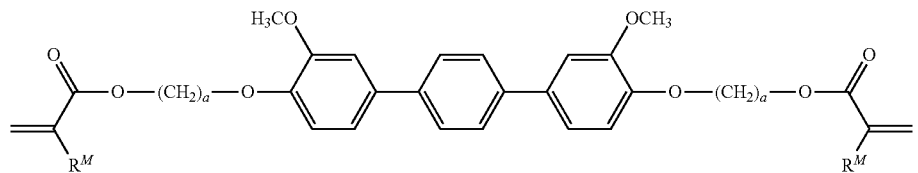

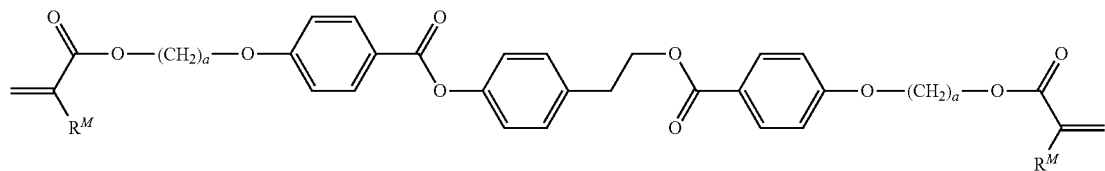
(M2-29)
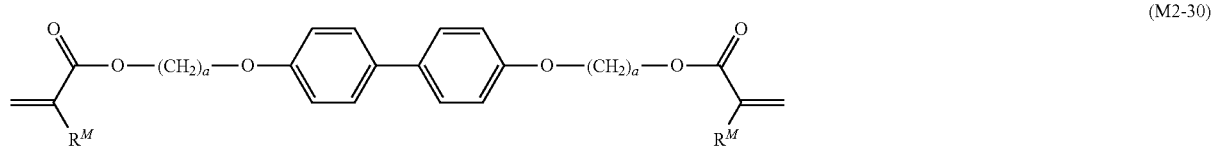
(M2-30)
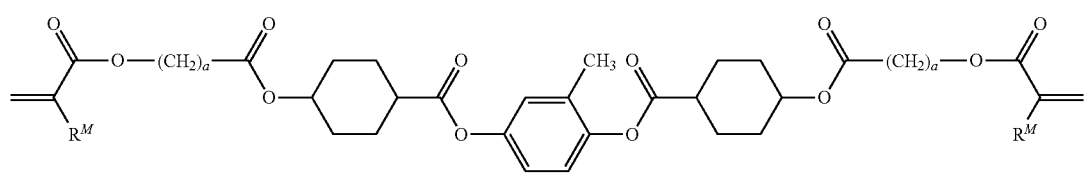
(M2-31)
In formulae (M2-1) to (M2-31), each $R^M$ is independently hydrogen or methyl, and each a is independently an integer of 1 to 12. When two or more a's are present in a formula, arbitrary two of the a's may be the same or different.
Preferred examples of the compound represented by formula (M3) are shown below.
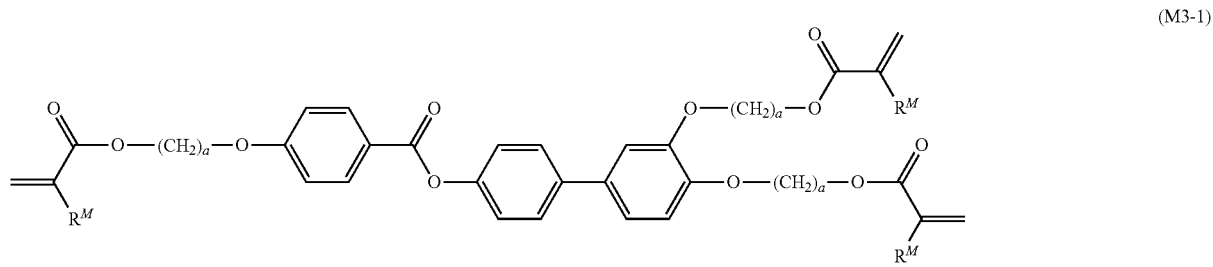
(M3-1)
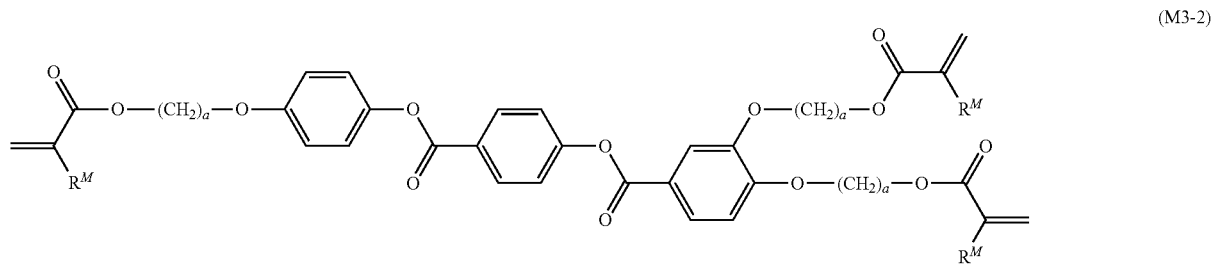
(M3-2)
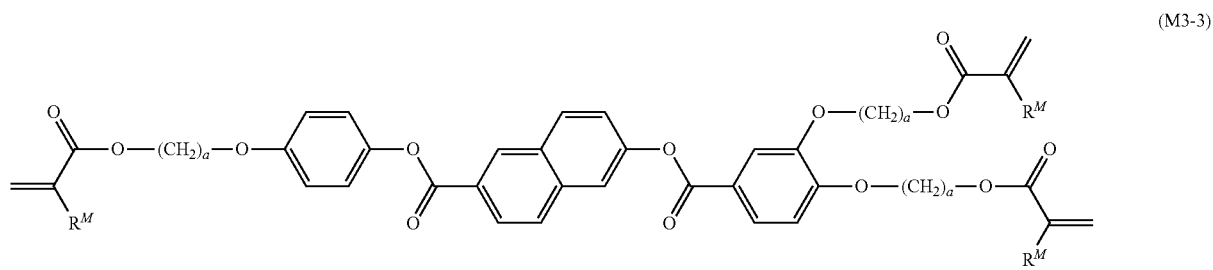
(M3-3)

(M3-4)
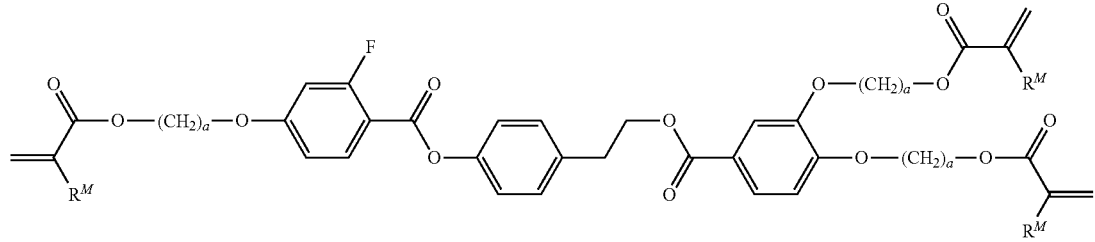
(M3-5)
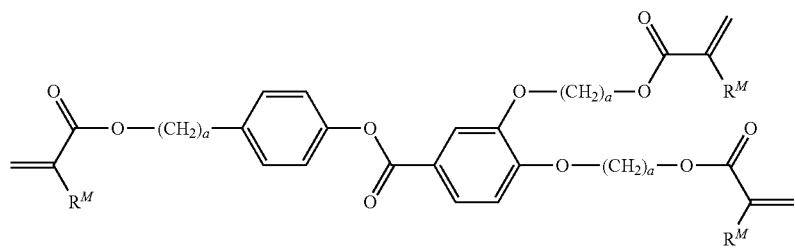
(M3-6)
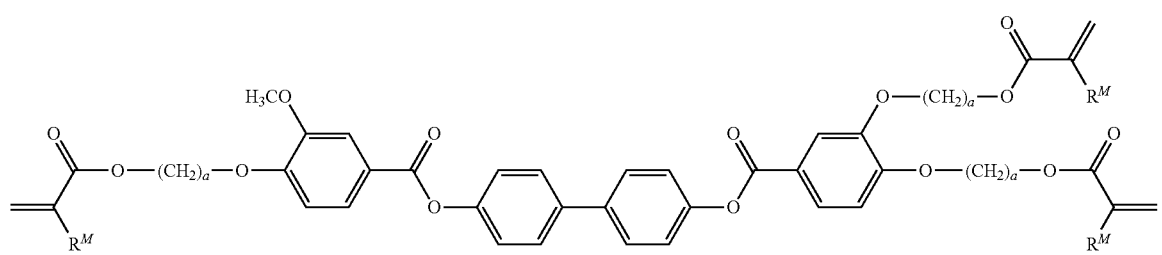
(M3-7)
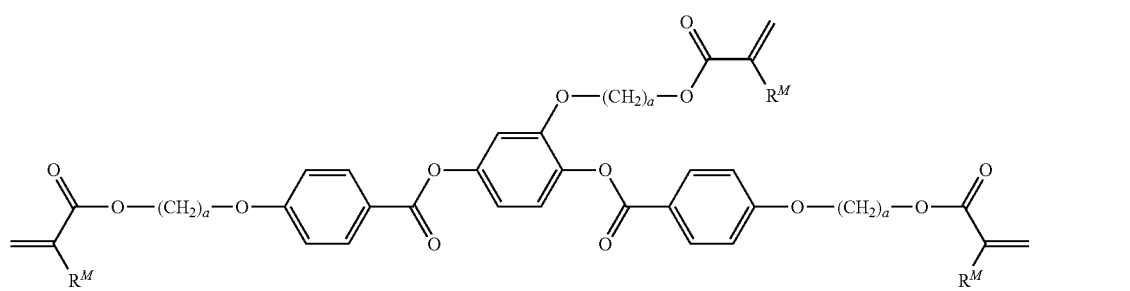
(M3-8)
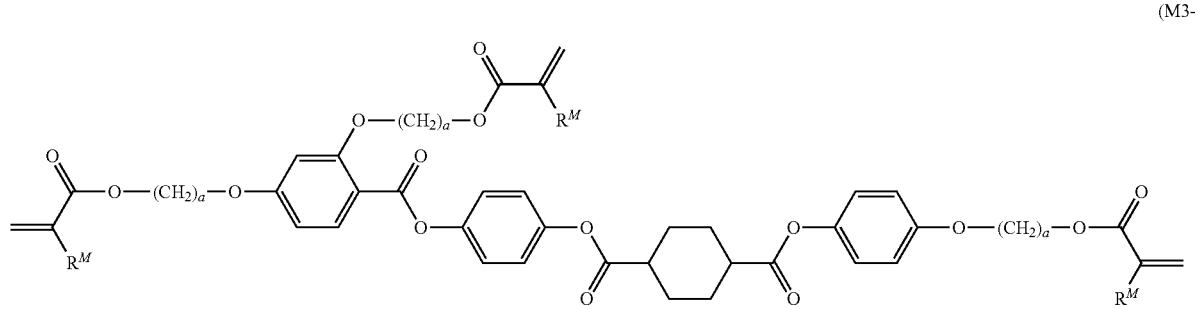
(M3-9)
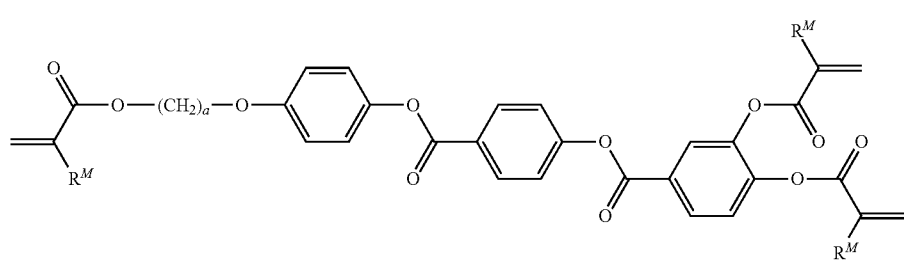

-continued

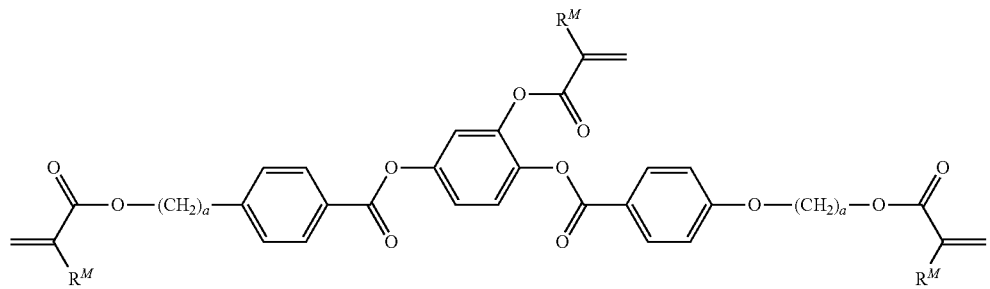
(M3-10)

In formulae (M3-1) to (M3-10), each $R^M$ is independently hydrogen or methyl, and each a is independently an integer of 1 to 12. When two or more a's are present in a formula, arbitrary two of the a's may be the same or different.

Based on the magnitude of the tilt angle and so on, the alignments of a liquid crystal compound are classified into homogeneous (parallel), homeotropic (perpendicular), tilted, and twisted, etc. The tilt angle is an angle between an alignment state of the liquid crystal compound and a supporting base material. Homogeneous is a state in which the alignment state is parallel to the base material and the respective molecules of the liquid crystal compound are parallel with each other in one direction. The tilt angle in homogeneous alignment is, e.g., from 0° to 5°. The homeotropic state is a state in which the alignment state is perpendicular to the base material. The tilt angle in homeotropic alignment is, e.g., from 85° to 90°. The tilted state is a state of rising from a parallel state to a perpendicular state as the alignment state is away from the base material. The tilt angle in tilted alignment is, e.g., from 5° to 85°. The twisted state is a state in which the alignment state is parallel to the base material but is twisted in a stepped fashion about a helical axis. The tilt angle in twisted alignment is, e.g., from 0° to 5°.

The polymerizable liquid crystal composition of the invention contains at least one compound selected from the group consisting of compounds represented by formula (M). As the polymerizable liquid crystal composition of the invention is coated onto a plastic substrate that has undergone an alignment treatment such as a rubbing treatment or the like, or onto a support substrate with its surface covered by a plastic thin film, to form a film, homogeneous alignment or hybrid alignment is obtained. In addition, as a later-described non-polymerizable or polymerizable optically active compound is added to the polymerizable LC composition of the invention, twisted alignment is obtained. When a later-described compound having a cardo structure or a monofunctional liquid crystal compound is added to the polymerizable liquid crystal composition of the invention, homeotropic alignment can be more easily obtained.

There may be embodiments in which the content of the compound represented by the above formula (M) in the polymerizable liquid crystal composition of the invention is generally 3 wt % or more, preferably 5 wt % or more, relative to the total amount of the polymerizable liquid crystal composition. Meanwhile, there may be embodiments in which the content of the compound represented by the above formula (M) is generally 50 wt % or less, preferably 45 wt % or less, relative to the total amount of the polymerizable liquid crystal composition.

[1-2. Solvent]

It is necessary that the solvent contained in the polymerizable liquid crystal composition is a solvent capable of sufficiently dissolving the polymerizable liquid crystal compound, and one or more compounds that are contained if desired, such as an optically active compound, and a polymerization initiator that accelerates curing of the polymerizable liquid crystal compound. Particularly, since the solubility of the polymerizable liquid crystal compound has large influence on the film thickness or unevenness and cissing during coating, it is necessary to have sufficient solubility.

The polymerizable liquid crystal composition of the invention contains, as the solvent, a diacetate solvent and a ketone solvent. By containing the diacetate solvent and the ketone solvent, it is possible to achieve both high solubility of the polymerizable liquid crystal compound and an effect of suppressing occurrence of unevenness or cissing during coating, and thus a smooth optically anisotropic body can be obtained.

There may be embodiments in which the content of the solvent in the polymerizable liquid crystal composition is generally 50 wt % or more, preferably 60 wt % or more, relative to the total amount of the polymerizable liquid crystal composition. Meanwhile, there may be embodiments in which the content of the solvent is generally 97 wt % or less, preferably 95 wt % or less, relative to the total amount of the polymerizable liquid crystal composition.

In addition, a monoacetate solvent and/or an ether solvent may also be contained as the solvent contained in the polymerizable liquid crystal composition.

[1-2-1. Diacetate Solvent]

The diacetate solvent is a compound both having two acetate structures in its molecule and having a liquid phase at about −20° C. to 100° C. at any pressure. The diacetate solvent is preferably a compound represented by the following formula (S).

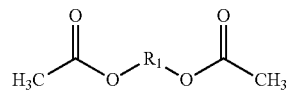
(S)

In formula (S), $R_1$ is alkylene having 1 to 20 carbons, wherein at least one —$CH_2$— in the alkylene is optionally replaced by —O— or —CO—, and the alkylene may be branched.

Preferred examples of the compound represented by formula (S) are shown below.

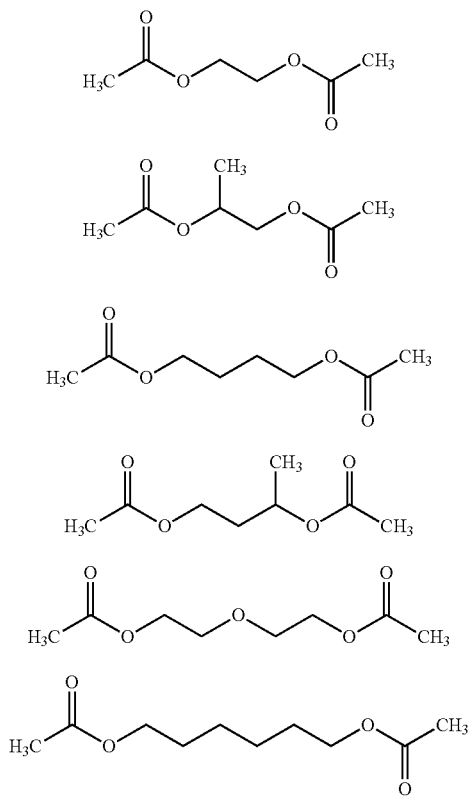

In the diacetate solvent represented by formula (S), because of high solubility of the polymerizable liquid crystal compound and effective suppression of occurrence of unevenness or cissing during coating, propylene glycol diacetate, 1,4-butanediol diacetate, and 1,3-butylene glycol diacetate, etc. are preferred, and propylene glycol diacetate, 1,4-butanediol diacetate, and a combination thereof are more preferred.

There may be embodiments in which the content of the diacetate solvent relative to the total amount of the solvent contained in the polymerizable liquid crystal composition is preferably 1 to 75 wt %, preferably 5 to 50 wt %.

[1-2-2. Ketone Solvent]

The ketone solvent is a compound both having a ketone structure in its molecule and having a liquid phase at about −20° C. to 100° C. at any pressure. The ketone solvent is preferably compounds represented by the following formulae (K1) and (K2).

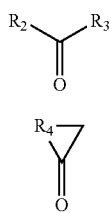

$R_2$ and $R_3$ are each independently alkyl having 1 to 20 carbons, wherein at least one —$CH_2$— in the alkyl is optionally replaced by —O— or —CO—, and the alkyl may be branched.

Each $R_4$ is independently alkylene having 1 to 20 carbons, wherein at least one —$CH_2$— in the alkylene is optionally replaced by —O— or —CO—, and the alkylene may be branched.

Among the compounds represented by formulae (K1) and (K2), acetone, methyl ethyl ketone, methyl isobutyl ketone, cyclohexanone, cyclopentanone, and methyl propyl ketone, etc. are preferred. Cyclopentanone is more preferred because of high solubility of the polymerizable liquid crystal compound therein.

There may be embodiments in which the content of the ketone solvent relative to the total amount of the solvent contained in the polymerizable liquid crystal composition is preferably 25 to 99 wt %, more preferably 50 to 95 wt %.

With regard to the proportion of the diacetate solvent and the ketone solvent in the polymerizable liquid crystal composition, there may be embodiments in which when the solvent contained in the polymerizable liquid crystal composition only includes the diacetate solvent and the ketone solvent, the content of the ketone solvent relative to the total amount of the solvent is preferably 50 wt % or more.

[1-2-3. Monoacetate Solvent]

The monoacetate solvent is a compound both having a single acetate structure in its molecule and having a liquid phase at about −20° C. to 100° C. at any pressure. The monoacetate solvent is preferably ethylene glycol monomethyl ether acetate, propylene glycol monomethyl ether acetate, propylene glycol monoethyl ether acetate, methyl acetoacetate, or 1-methoxy-2-propyl acetate, etc. Among them, propylene glycol monomethyl ether acetate is more preferred because of high solubility of the polymerizable liquid crystal compound therein.

There may be embodiments in which when the solvent contained in the polymerizable liquid crystal composition contains the monoacetate solvent, the content thereof is 30 wt % or less relative to the total amount of the solvent. On the other hand, as for the lower limit, the content may be 0.1 wt % or more relative to the total amount of the solvent.

[1-2-4. Ether Solvent]

The ether solvent is a compound both having an ether structure in its molecule and having a liquid phase at about −20° C. to 100° C. at any pressure. The ether solvent is preferably ethylene glycol dimethyl ether, diethylene glycol dimethyl ether, bis(2-propyl) ether, 1,4-dioxane, tetrahydrofuran (THF), ethylene glycol monoalkyl ether (e.g., ethylene glycol monomethyl ether and ethylene glycol monobutyl ether), diethylene glycol monoalkyl ether (e.g., diethylene glycol monoethyl ether), triethylene glycol monoalkyl ether, propylene glycol monoalkyl ether (e.g., propylene glycol monobutyl ether), dipropylene glycol monoalkyl ether (e.g., dipropylene glycol monomethyl ether), ethylene glycol monoalkyl ether acetate (e.g., ethylene glycol monobutyl ether acetate), diethylene glycol monoalkyl ether acetate (e.g., diethylene glycol monoethyl ether acetate), triethylene glycol monoalkyl ether acetate, propylene glycol monoalkyl ether acetate (e.g., propylene glycol monomethyl ether acetate, propylene glycol monoethyl ether acetate, and propylene glycol monobutyl ether acetate), dipropylene glycol monoalkyl ether acetate (e.g., dipropylene glycol monomethyl ether acetate), or diethylene glycol methyl ethyl ether, etc.

There may be embodiments in which when the solvent contained in the polymerizable liquid crystal composition contains the ether solvent, the content thereof is less than 10 wt % relative to the total amount of the solvent. On the other hand, as for the lower limit, the content may be 0.1 wt % or more relative to the total amount of the solvent.

[1-2-5. Other Solvents]

Examples of the other solvents include an amide solvent, an alcohol solvent, and a hydrocarbon solvent containing or not containing aromatics, etc. However, since these solvents reduce the effects of the invention, i.e., solubility of the polymerizable liquid crystal compound and the effect of suppressing unevenness or cissing during coating, their total content is preferably 5 wt % or less relative to the total amount of the solvent.

The amide solvent is preferably N-methyl-2-pyrrolidone, N,N-dimethylacetamide, N-methylpropionamide, N,N-dimethylformamide, N,N-diethylformamide, N,N-diethylacetamide, N,N-dimethylacetamide dimethyl acetal, N-methylcaprolactam or dimethyl imidazolidinone, etc.

The alcohol solvent is preferably methanol, ethanol, 1-propanol, 2-propanol, 1-methoxy-2-propanol, t-butyl alcohol, sec-butyl alcohol, butanol, 2-ethyl butanol, n-hexanol, n-heptanol, n-octanol, 1-dodecanol, ethylhexanol, 3,5,5-trimethylhexanol, n-amyl alcohol, hexafluoro-2-propanol, glycerin, ethylene glycol, diethylene glycol, triethylene glycol, tetraethylene glycol, propylene glycol, dipropylene glycol, tripropylene glycol, hexylene glycol, 1,3-butanediol, 1,4-butanediol, 2,3-butanediol, 1,5-pentanediol, 2,4-pentanediol, 2,5-hexanediol, 3-methyl-3-methoxybutanol, cyclohexanol, or methylcyclohexanol, etc.

The hydrocarbon solvent containing aromatics is preferably benzene, toluene, xylene, mesitylene, ethylbenzene, diethylbenzene, i-propylbenzene, n-propylbenzene, t-butylbenzene, s-butylbenzene, n-butylbenzene, or tetralin, etc. Examples of the hydrocarbon solvent containing aromatics further include a halogenated aromatic hydrocarbon-based solvent, and preferred examples thereof include chlorobenzene. Examples of the hydrocarbon solvent not containing aromatics include an aliphatic hydrocarbon-based solvent, and preferred examples thereof include hexane and heptane, etc. Examples of the hydrocarbon solvent not containing aromatics further include a halogenated aliphatic hydrocarbon-based solvent, and preferred examples thereof include chloroform, dichloromethane, carbon tetrachloride, dichloroethane, trichloroethylene and tetrachloroethylene, etc. Examples of the hydrocarbon solvent not containing aromatics further include an alicyclic hydrocarbon-based solvent, and preferred examples thereof include cyclohexane and decalin, etc.

[1-3. Surfactant]

The polymerizable liquid crystal composition of the invention may further contain a surfactant. The surfactant is preferably a nonionic surfactant. When the polymerizable liquid crystal composition contains a nonionic surfactant, effects of enhancing smoothness of a coating film formed from the polymerizable liquid crystal composition, and suppressing the tilted alignment on the side of the air interface, etc. are achieved.

When a nonionic surfactant is added, a preferred proportion thereof is 0.0001 to 0.5 in terms of the weight ratio relative to the weight of the polymerizable liquid crystal compound. A more preferred weight ratio ranges from 0.0001 to 0.005.

The nonionic surfactant is, e.g., a silicone-based nonionic surfactant, a fluorine-based nonionic surfactant, or a hydrocarbon-based nonionic surfactant, etc.

Examples of the silicone-based nonionic surfactant include Polyflow ATF-2, Glanol 100, Glanol 115, Glanol 400, Glanol 410, Glanol 435, Glanol 440, Glanol 450, Glanol B-1484, Polyflow KL-250, Polyflow KL-260, Polyflow KL-270, Polyflow KL-280, BYK-300, BYK-302, BYK-306, BYK-307, BYK-310, BYK-315, BYK-320, BYK-322, BYK-323, BYK-325, BYK-330, BYK-331, BYK-333, BYK-337, BYK-341, BYK-342, BYK-344, BYK-345, BYK-346, BYK-347, BYK-348, BYK-370, BYK-375, BYK-377, BYK-378, BYK-3500, BYK-3510, and BYK-3570, etc., all of which are produced by Kyoeisha Chemical Co., Ltd. and contain a non-modified silicone or a modified silicone as a main component.

Examples of the fluorine-based nonionic surfactant include BYK-340, Ftergent 251, Ftergent 221MH, Ftergent 250, FTX-215M, FTX-218M, FTX-233M, FTX-245M, FTX-290M, FTX-209F, FTX-213F, Ftergent 222F, FTX-233F, FTX-245F, FTX-208G, FTX-218G, FTX-240G, FTX-206D, Ftergent 212D, FTX-218, FTX-220D, FTX-230D, FTX-240D, FTX-720C, FTX-740C, FTX-207S, FTX-211S, FTX-220S, FTX-230S, KB-L82, KB-L85, KB-L97, KB-L109, KB-L110, KB-F2L, KB-F2M, KB-F2S, KB-F3M, and KB-FaM, etc.

Examples of the hydrocarbon-based nonionic surfactant include Polyflow No. 3, Polyflow No. 50EHF, Polyflow No. 54N, Polyflow No. 75, Polyflow No. 77, Polyflow No. 85HF, Polyflow No. 90, Polyflow No. 95, Polyflow No. 99C, BYK-350, BYK-352, BYK-354, BYK-355, BYK-358N, BYK-361N, BYK-380N, BYK-381, BYK-392, and BYK-Silclean 3700, etc., all of which contain an acrylic polymer as a main component.

In addition, the surfactant may have a polymerizable group in order to be integrated with the polymerizable liquid crystal compound. Examples of the polymerizable group introduced into the surfactant include a UV reactive functional group or a functional group having thermal polymerizability, etc. In view of the reactivity with the polymerizable liquid crystal compound, a UV reactive functional group is preferred.

To optimize wettability to the base material, the surfactant may be used in combination with a surfactant classified as a (base material-)wetting agent. The wetting agent has effects of reducing surface tension of the polymerizable liquid crystal composition and enhancing the wettability to a coating base material. Examples of such wetting agent include Polyflow series (KL-100, KL-700, LE-604, LE-605, LE-606), TEGO Twin series (4000), and TEGO Wet series (KL245, 250, 260, 265, 270, 280, 500, 505, 510), etc. Moreover, a surfactant containing a fluoride-modified polymer or a fluoride-modified acrylic polymer as a main component may be applied as an adjuvant for the wetting agent. Examples of such include 3000 series (e.g., 3277, 3700 and 3770) made by AFCONA Additives Co., Ltd.

Moreover, "Polyflow" and "Glanol" mentioned above are both trade names available from Kyoeisha Chemical Co., Ltd. "BYK" is a trade name available from BYK Japan KK. "Ftergent," "FTX" and "KB" are trade names available from Neos Corporation.

The above surfactants may be used alone or as a mixture of two or more thereof.

[1-4. Other Polymerizable Compounds, and Additive]

The above polymerizable liquid crystal composition may also contain other polymerizable compounds, and an additive.

Examples of the other polymerizable compounds and the additive are shown below. These compounds may be commercially available.

[1-4-1. Other Polymerizable Compounds]

Examples of the other polymerizable compounds include compound without liquid crystal property, such as a vinyl derivative, a styrene derivative, a (meth)acrylic acid derivative, an oxirane derivative, an oxetane derivative, a sorbic acid derivative, a fumaric acid derivative, and an itaconic acid derivative, etc. The other polymerizable compounds without LC property include a compound with one polymerizable group, a compound with two polymerizable groups and a multifunctional compound with 3 or more polymerizable groups, etc.

The other polymerizable compounds may be added as long as a liquid crystal phase can be maintained. The amount of the other polymerizable compounds is preferably 0.5 or less in terms of the weight ratio relative to the weight of the compound represented by formula (M), or, when any other liquid crystal compound or any other polymerizable liquid crystal compound is contained, relative to the total weight of the contained other liquid crystal compound or other polymerizable liquid crystal compound and the compound represented by formula (M).

Examples of the compound having one polymerizable group include styrene, nucleus-substituted styrene, acrylonitrile, vinyl chloride, vinylidene chloride, vinylpyridine, N-vinylpyrrolidone, vinyl sulfonic acid, a fatty acid vinyl ester (e.g., vinyl acetate), an α,β-ethylenically unsaturated carboxylic acid (e.g., acrylic acid, methacrylic acid, maleic acid, fumaric acid, itaconic acid, etc.), an alkyl ester of (meth)acrylic acid (the alkyl having 1 to 18 carbons), a hydroxyalkyl ester of (meth)acrylic acid (the hydroxyalkyl having 1 to 18 carbons), an aminoalkyl ester of (meth)acrylic acid (the aminoalkyl having 1 to 18 carbons), an ether oxygen-containing alkyl ester of (meth)acrylic acid (the ether oxygen-containing alkyl having 3 to 18 carbons, e.g., methoxyethyl ester, ethoxyethyl ester, and methoxypropyl ester), N-vinylacetamide, vinyl p-t-butyl benzoate, vinyl N,N-dimethylaminobenzoate, vinyl benzoate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, dicyclopentanyloxyethyl (meth)acrylate, isobonyloxyethyl (meth)acrylate, isobonyl (meth)acrylate, adamantyl (meth)acrylate, dimethyladamantyl (meth)acrylate, dicyclopentanyl (meth)acrylate, dicyclopentenyl (meth)acrylate, 2-acryloyloxyethyl succinate, 2-acryloyloxyethyl hexahydrophthalate, 2-acryloyloxyethyl phthalate, 2-acryloyloxyethyl-2-hydroxyethyl phthalate, 2-acryloyloxyethyl acid phosphate, 2-methacryloxyethyl acid phosphate, a mono(meth)acrylate or a di(meth)acrylate of polyalkylene glycol such as polyethylene glycol, polypropylene glycol, and a copolymer of ethylene oxide and propylene oxide, etc., each having a polymerization degree of 1 to 100, and a mono(meth)acrylate of polyalkylene glycol such as polyethylene glycol, polypropylene glycol, and a copolymer of ethylene oxide and propylene oxide, etc., each having a polymerization degree of 1 to 100 and having terminals capped by an alkyl group having 1 to 6 carbons.

Examples of the compound having two polymerizable groups include 1,4-butanediol diacrylate, 1,6-hexanediol diacrylate, 1,9-nonanediol diacrylate, neopentylglycol diacrylate, dimethyloltricyclodecane diacrylate, triethylene glycol diacrylate, dipropylene glycol diacrylate, tripropylene glycol diacrylate, tetraethylene glycol diacrylate, diacrylate of an EO-adduct of bisphenol A, bisphenol A glycidyl diacrylate (Viscoat V#700), polyethyleneglycol diacrylate, and a methacrylate compound of these compounds, etc.

Examples of the compound having three or more polymerizable groups include pentaerythritol tri(meth)acrylate, trimethylolpropane tri(meth)acrylate, trimethylol EO-added tri(meth)acrylate, tris(meth)acryloyloxyethyl phosphate, tris((meth)acryloyloxyethyl)isocyanurate, alkyl-modified dipentaerythritol tri(meth)acrylate, EO-modified trimethylolpropane tri(meth)acrylate, PO-modified trimethylolpropane tri(meth)acrylate, pentaerythritol tetra(meth)acrylate, alkyl-modified dipentaerythritol tetra(meth)acrylate, ditrimethylolpropane tetra(meth)acrylate, dipentaerythritol hexa(meth)acrylate, dipentaerythritol monohydroxypenta(meth)acrylate, alkyl-modified dipentaerythritol penta(meth)acrylate, Viscoat V#802 (the number of functional groups=8), and Viscoat V#1000 (the number of functional groups=14 on average), etc. "Viscoat" is a trade name of Osaka Organic Chemical Industry Ltd. A compound having 16 or more functional groups is obtained by using, as a raw material, Boltorn H20 (16 functions), Boltorn H30 (32 functions) and Boltom H40 (64 functions), all being sold by Perstorp Specialty Chemicals AB, and acrylating the same.

Examples of the other polymerizable compounds further include a polymerizable fluorene derivative having a cardo structure. These compounds are suitable for further controlling an alignment direction or increasing a degree of curing of a polymer. Examples of the same are expressed by formulae (α-1) to (α-6).

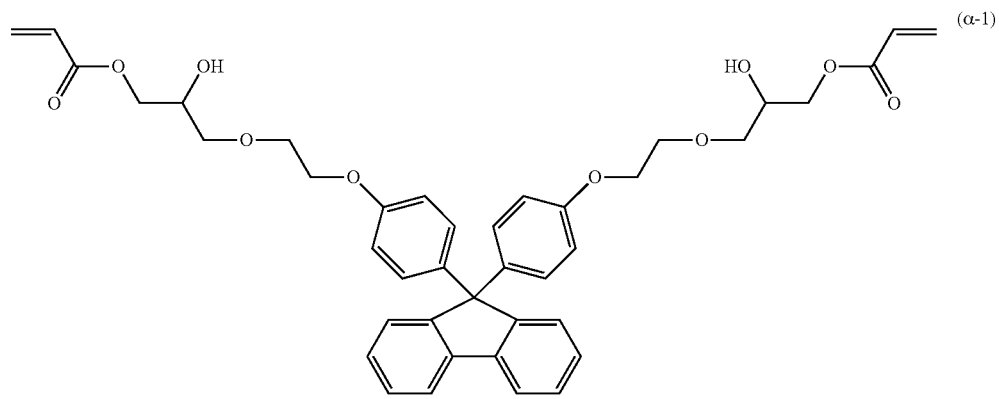

(α-1)

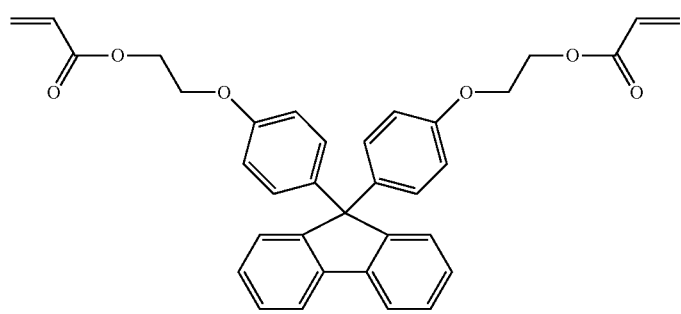
(α-2)
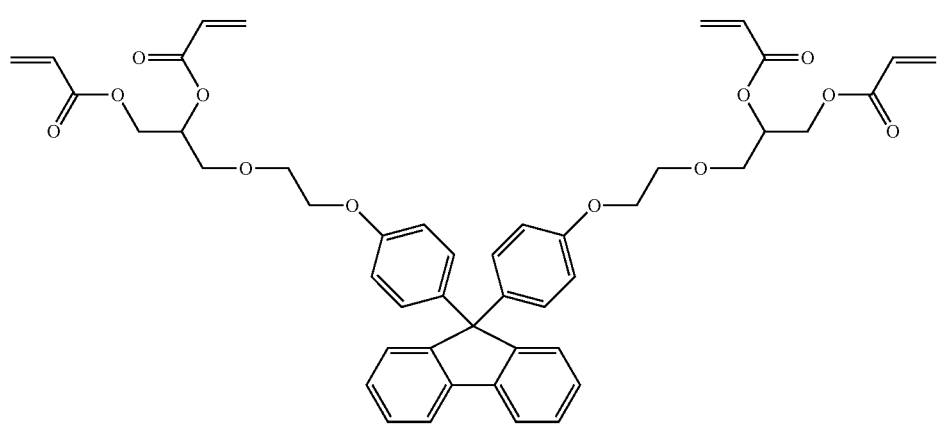
(α-3)
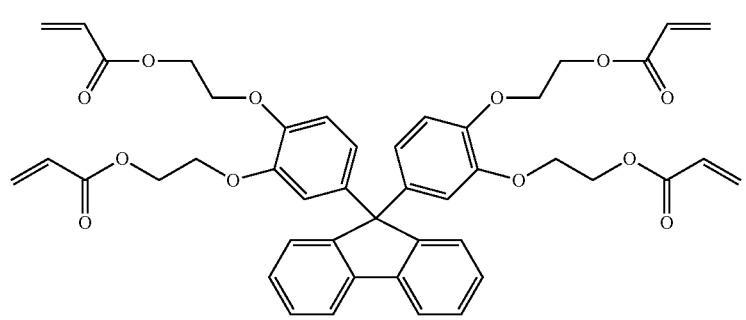
(α-4)
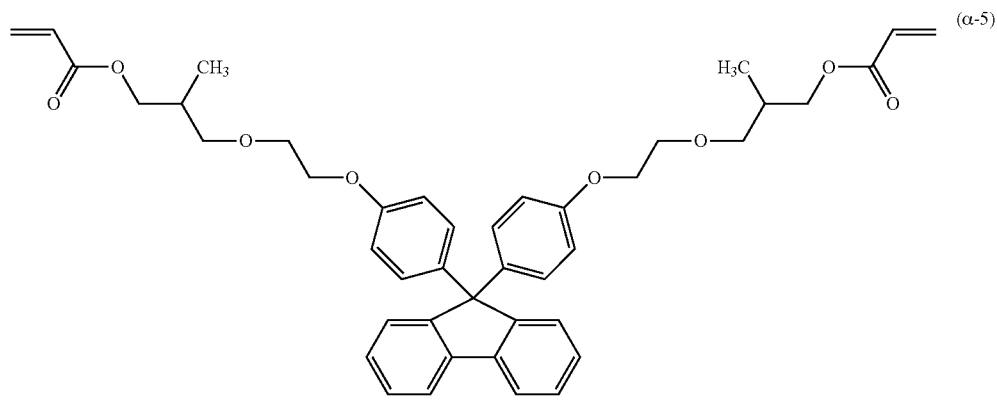
(α-5)

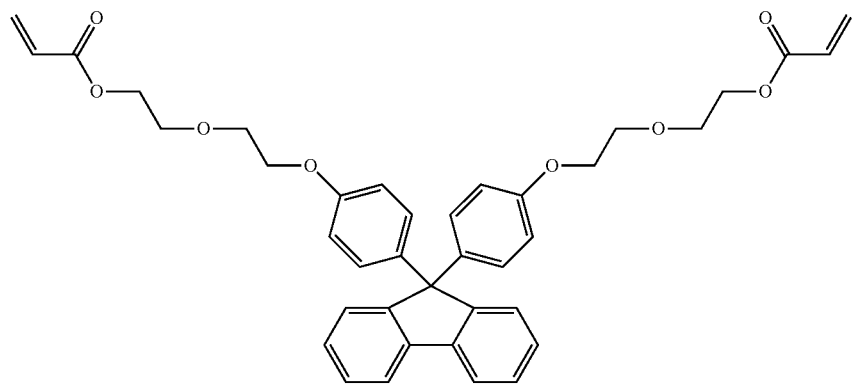
In addition, examples of the other polymerizable compounds further include a polymerizable compound having a bisphenol structure. These compounds are suitable for aiding film forming properties or alignment uniformity of the polymerizable liquid crystal composition. Examples of the same are expressed by formulae (N-1) to (N-6).
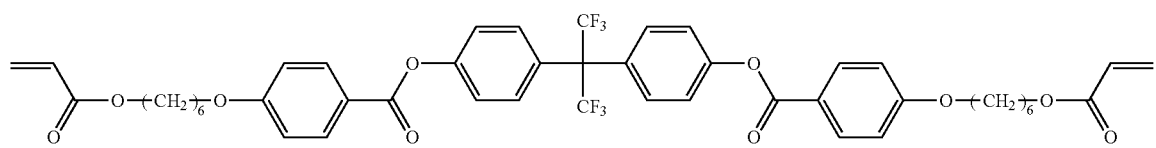
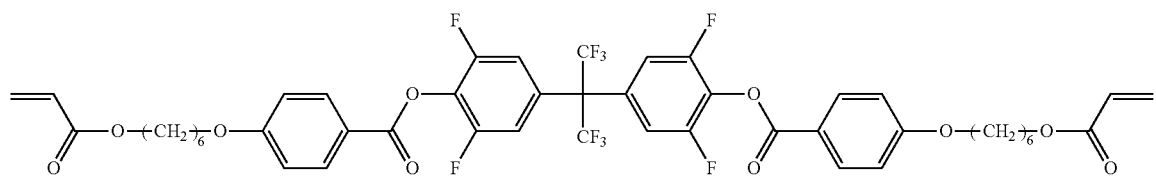
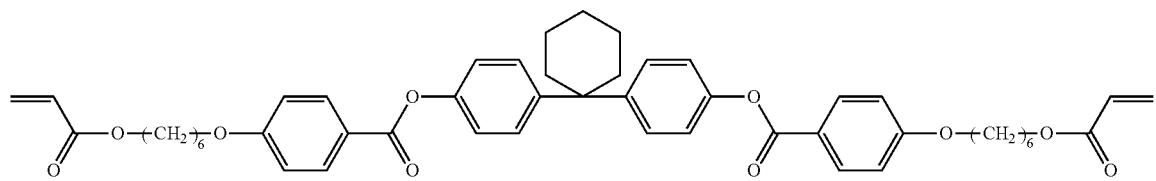
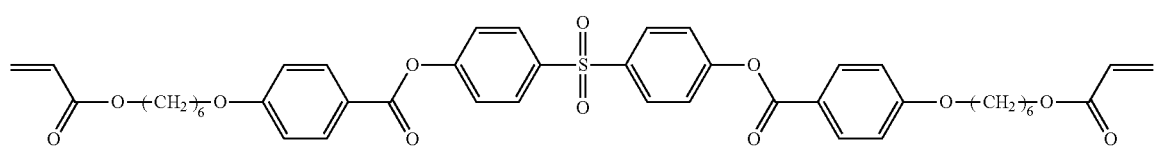
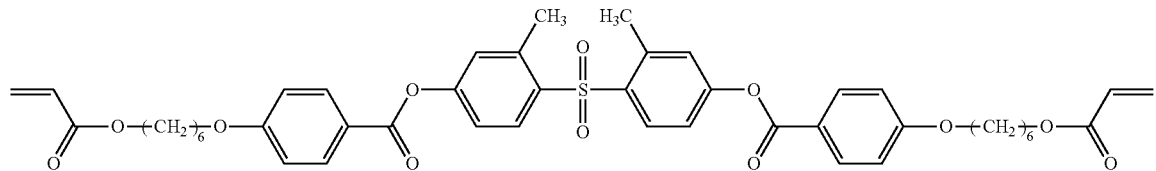

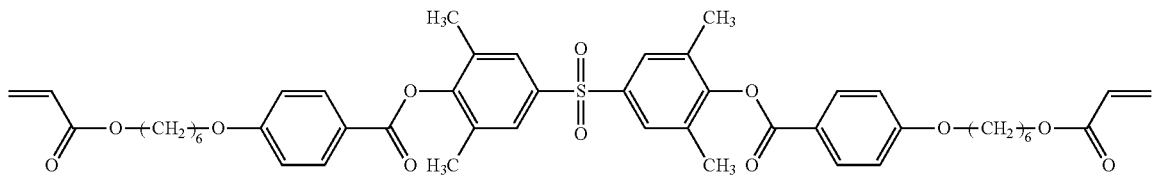
(N-6)

The aforementioned other polymerizable compounds may be used alone or as a mixture of two or more thereof. In addition, these compounds may be commercially available.

[1-4-2. Additive]

A polymerization initiator may be added to the polymerizable liquid crystal composition to optimize the polymerization rate. Examples thereof include a photo-radical polymerization initiator. Examples of the photo-radical polymerization initiator include 2-hydroxy-2-methyl-1-phenylpropan-1-one (Darocur 1173), 1-hydroxycyclohexyl phenyl ketone, 2,2-dimethoxy-1,2-diphenylethan-1-one (Irgacure 651), 1-hydroxy-cyclohexyl-phenyl-ketone (Irgacure 184), Irgacure 127, Irgacure 500 (mixture of Irgacure 184 and benzophenone), Irgacure 2959, Irgacure 907, Irgacure 369, Irgacure 379, Irgacure 754, Irgacure 1300, Irgacure 819, Irgacure 1700, Irgacure 1800, Irgacure 1850, Irgacure 1870, Darocur 4265, Darocur MBF, Darocur TPO, Irgacure 784, Irgacure 754, Irgacure OXE01, Irgacure OXE02, Adeka Optomer N-1919, Adeka Arkls NCI-831 and Adeka Arkls NCI-930, etc. "Darocur" and "Irgacure" mentioned above are both trade names available from BASF Japan Ltd. "Adeka Optomer" and "Adeka Arkls" are both trade names available from ADEKA Corporation.

Examples of the photo-radical polymerization initiator further include p-methoxyphenyl-2,4-bis(trichloromethyl)triazine, 2-(p-butoxystyryl)-5-trichloromethyl-1,3,4-oxadiazole, 9-phenylacridine, 9,10-benzphenazine, a benzophenone/Michler's ketone mixture, a hexaarylbiimidazole/mercaptobenzimidazole mixture, 1-(4-isopropylphenyl)-2-hydroxy-2-methylpropan-1-one, benzyl dimethyl ketal, 2-methyl-1-[4-(methylthio)phenyl]-2-morpholinopropan-1-one, a 2,4-diethylxanthone/methyl p-dimethylaminobenzoate mixture, and a benzophenone/methyltriethanolamine mixture, etc.

A preferred amount of the photo-radical polymerization initiator added is 0.0001 to 0.20 in terms of the weight ratio relative to the total amount of the polymerizable liquid crystal compound contained in the polymerizable liquid crystal composition. The weight ratio preferably ranges from 0.001 to 0.15, and more preferably ranges from 0.01 to 0.15. The above photo-radical polymerization initiators may be used alone or as a mixture of two or more thereof. Also, these polymerization initiators may be commercially available.

In addition, a sensitizer may be added to these photo-radical polymerization initiators for use. Examples of the sensitizer include isopropylthioxanthone, diethylthioxantone, ethyl-4-dimethylaminobenzoate (Darocur EDB), and 2-ethylhexyl-4-dimethylaminobenzoate (Darocur EHA), etc. These sensitizers may be used alone or as a mixture of two or more thereof. In addition, these sensitizers may be commercially available.

A chain transfer agent may be added to the polymerizable liquid crystal composition in order to control a polymerization reaction rate or mechanical characteristics of a polymer. By using the chain transfer agent, the reaction rate or chain length of the obtained polymer can be controlled. When the amount of the chain transfer agent is increased, the polymerization reaction rate is reduced and the length of the polymer chain is decreased. The chain transfer agent is preferably a thiol compound or a styrene dimer. These chain transfer agents may be used alone or as a mixture of two or more thereof. In addition, these chain transfer agents may be commercially available.

The thiol-based chain transfer agent is a monofunctional thiol, such as dodecanethiol and 2-ethylhexyl-3-mercaptopropionate, etc., or a multifunctional thiol, such as trimethylolpropane tris(3-mercaptopropionate), pentaerythritol tetrakis(3-mercaptopropionate), 1,4-bis(3-mercaptobutyryloxy)butane (Karenz MT BD1), pentaerythritol tetrakis(3-mercaptobutylate) (Karenz MT PE1), and 1,3,5-tris(3-mercaptobutyloxyethyl)-1,3,5-triazine-2,4,6(1H,3H,5H)-trione (Karenz MT NR1), etc. "Karenz" is a trade name of Showa Denko K.K.

Examples of the styrene dimer-based chain transfer agent include 2,4-diphenyl-4-methyl-1-pentene, and 2,4-diphenyl-1-butene, etc.

A polymerization inhibitor can be added to the polymerizable liquid crystal composition in order to prevent initiation of polymerization during storage. A well-known polymerization inhibitor can be used, and preferred examples thereof include 2,5-di(t-butyl)hydroxytoluene (BHT), hydroquinone, methylene blue, diphenylpicrylhydrazide (DPPH), phenothiazine, a nitroso compound such as N,N-dimethyl-4-nitrosoaniline, o-hydroxybenzophenone, and a benzothiazine derivative such as 2H-1,3-benzothiazine-2,4-(3H)dione, etc.

A polymerization blocking agent can also be added in order to enhance preservability of the polymerizable liquid crystal composition. When a radical is generated within the polymerizable liquid crystal composition, a polymerization reaction of the polymerizable compound is accelerated. To prevent this, a polymerization blocking agent is preferably added. A phenol-based antioxidant, a sulfur-based antioxidant and a phosphoric acid-based antioxidant can be utilized as the polymerization blocking agent.

A UV absorbent, a light stabilizer (radical scavenger) or an antioxidant, etc. may be added to further enhance the weather resistance of the polymerizable liquid crystal composition.

Examples of the UV absorbent include Tinuvin PS, Tinuvin P, Tinuvin 99-2, Tinuvin 109, Tinuvin 213, Tinuvin 234, Tinuvin 326, Tinuvin 328, Tinuvin 329, Tinuvin 384-2, Tinuvin 571, Tinuvin 900, Tinuvin 928, Tinuvin 1130, Tinuvin 400, Tinuvin 405, Tinuvin 460, Tinuvin 479, Tinuvin 5236, ADK Stab LA-32, ADK Stab LA-34, ADK Stab LA-36, ADK Stab LA-31, ADK Stab 1413, and ADK Stab LA-51, etc. "Tinuvin" is a trade name of BASF Japan Ltd.; "ADK Stab" is a trade name of ADEKA Corporation. These UV absorbents may be used alone or as a mixture of two or more thereof. In addition, the UV absorbents may be commercially available.

Examples of the light stabilizer include Tinuvin 111FDL, Tinuvin 123, Tinuvin 144, Tinuvin 152, Tinuvin 292, Tinuvin 622, Tinuvin 770, Tinuvin 765, Tinuvin 780, Tinuvin 905, Tinuvin 5100, Tinuvin 5050, Tinuvin 5060, Tinuvin 5151, Chimassorb 119FL, Chimassorb 944FL, Chimassorb 944LD, ADK Stab LA-52, ADK Stab LA-57, ADK Stab LA-62, ADK Stab LA-67, ADK Stab LA-63P, ADK Stab LA-68LD, ADK Stab LA-77, ADK Stab LA-82, ADK Stab LA-87, Cyasorb UV-3346 produced by Cytec Industries, Inc., and Good-Rite UV-3034 produced by Goodrich Corporation, etc. "Chimassorb" is a trade name of BASF Japan Ltd. These light stabilizers may be used alone or as a mixture of two or more thereof. In addition, these light stabilizers may be commercially available.

Examples of the antioxidant include ADK Stab AO-20, AO-30, AO-40, AO-50, AO-60 and AO-80 produced by ADEKA Corporation, Sumilizer BHT, Sumilizer BBM-S and Sumilizer GA-80 commercially available from Sumitomo Chemical Co., Ltd., and Irganox 1076, Irganox 1010, Irganox 3114 and Irganox 245 commercially available from BASF Japan Ltd., etc. These antioxidants may be used alone or as a mixture of two or more thereof. In addition, these antioxidants may be commercially available.

A silane coupling agent may be added to the polymerizable liquid crystal composition to control the adhesiveness with the substrate, and so on. Examples of the silane coupling agent include vinyltrialkoxysilane, 3-isocyanatopropyltriethoxysilane, N-(2-aminoethyl)3-aminopropyltrialkoxysilane, N-(1,3-dimethylbutylidene)-3-(trialkoxysilyl)-1-propanamine, 3-glycidoxypropyltrialkoxysilane, 3-chlorotrialkoxysilane, 3-acryloxypropyltrimethoxysilane, and 3-methacryloxypropyltrialkoxysilane, etc. In addition, a dialkoxymethylsilane formed by replacing one of the (three) alkoxy groups in an above alkoxysilane by methyl can also be used as the silane coupling agent.

These silane coupling agents may be used alone or as a mixture of two or more thereof. In addition, these silane coupling agents may be commercially available.

[Optically Anisotropic Body]

The invention also relates to an optically anisotropic body formed from the polymerizable liquid crystal composition of the invention. The optically anisotropic body can be obtained in the following manner. First of all, the polymerizable liquid crystal composition in a flowable state is coated onto a support substrate to form a coating film. In a case where the solution of the polymerizable liquid crystal composition is prepared, the solution is coated onto the support substrate, followed by drying to form a coating film. The coating film is subjected to light irradiation to polymerize the polymerizable liquid crystal composition, and the alignment of the polymerizable liquid crystal composition in the coating film formed when the polymerizable liquid crystal composition is in the liquid crystal state is fixed. Examples of a usable material of the support substrate include glass and plastic, etc. Examples of the plastic include polyimide, polyamide-imide, polyamide, polyetherimide, polyetheretherketone, polyetherketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, acrylic resin, polyvinyl alcohol, polypropylene, cellulose, triacetylcellulose and partially saponified products thereof, epoxy resin, phenolic resin, and cycloolefin-based resin, etc. The support substrate is generally sheet-shaped or film-shaped.

Examples of the cycloolefin-based resin include, but are not limited to, norbornene-based resin and dicyclopentadiene-based resin, etc. Among them, those having no unsaturated bond or having unsaturated bonds that have been hydrogenated are suitably used. Examples thereof include a hydrogenated product of a ring-opening (co)polymer of one kind or two or more kinds of norbornene-based monomers, an addition (co)polymer of one kind or two or more kinds of norbornene-based monomers, an addition copolymer of a norbornene-based monomer and an olefin-based monomer (e.g., ethylene, α-olefin, etc.), an addition copolymer of a norbornene-based monomer and a cycloolefin-based monomer (e.g., cyclopentene, cyclooctene, 5,6-dihydroxycyclopentadiene, etc.), and modified products thereof. Specific examples thereof include Zeonex and Zeonor (trade names, produced by Zeon Corporation), Arton (trade name, produced by JSR Corporation), Topas (trade name, produced by Ticona), Apel (trade name, produced by Mitsui Chemicals, Inc.), Escena (trade name, produced by Sekisui Chemical Co., Ltd.) and Optorez (trade name, produced by Hitachi Chemical Co., Ltd.).

A film (plastic film) made of these plastics that can be used as the support substrate may be a uniaxially oriented film or a biaxially oriented film. These films may have undergone, e.g., a hydrophilic treatment such as a corona treatment or a plasma treatment, etc., or a surface treatment such as a hydrophobic treatment, etc. A method of the hydrophilic treatment is not particularly limited, but is preferably a corona treatment or a plasma treatment, and particularly preferably a plasma treatment. The plasma treatment may use the methods described in JP 2002-226616 and JP 2002-121648, etc. In addition, an anchor coat layer may be formed to improve adhesiveness between the liquid crystal film and the plastic film. Such an anchor coat layer may be either an inorganic material or an organic material without any problems as long as it can increase the adhesiveness between the liquid crystal film and the plastic film. In addition, the plastic film may be a laminated film. In place of the plastic film, a metal substrate made of aluminum, iron, or copper, etc. and having a slit-shaped groove formed on its surface or a glass substrate made of alkali glass, borosilicate glass, or flint glass, etc. and having its surface etched into a slit shape can also be used.

On these support substrates such as the glass substrate or the plastic substrate, when a liquid crystal film having a homogeneous alignment or hybrid alignment is formed prior to formation of the coating film of the polymerizable liquid crystal composition, a physical and mechanical surface treatment by rubbing, etc. is performed. When a liquid crystal film having a homeotropic alignment is formed, a surface treatment such as rubbing, etc. is usually not performed. However, the rubbing treatment may be performed in view of preventing alignment defects, etc. An arbitrary method can be adopted for the rubbing treatment. Generally, a method of winding a rubbing cloth made of rayon, cotton, a polyamide or the like around a metal roll or the like, and moving, while rotating, the roll being in contact with the support substrate or a polymer coating film, and a method of moving the support substrate while fixing the roll, etc. are adopted. The rubbing treatment may be performed directly on the support substrate, or may be performed on the polymer coating film made of a polyimide or the like, commonly called an alignment film, which is provided in advance on the support substrate. A method of the rubbing treatment is as described above. Depending on the type of the support substrate, silicon oxide can also be obliquely evaporate-deposited on a surface of the supporting substrate so as to impart aligning capability thereto.

In addition, in a case where s liquid crystal film having homogeneous alignment or hybrid alignment is to be formed, in addition to the physical and mechanical surface treatment by rubbing, etc., a polymer coating film made of a polyimide or a polyacrylate, etc., commonly called a photoalignment film, may be provided in advance on the support substrate, followed by being subjected to a polarized UV treatment.

During coating of the polymerizable liquid crystal composition or the solution thereof, examples of a coating method for obtaining a uniform film thickness include a spin-coating method, a microgravure coating method, a gravure coating method, a wire-bar coating method, a dip-coating method, a spray-coating method, a meniscus coating method, and a die-coating method. Particularly, the wire-bar coating method or the like in which shear stress acts on the polymerizable liquid crystal composition during coating may be used in a case where the alignment of the polymerizable liquid crystal composition is controlled without performing the substrate surface treatment by rubbing, etc.

During coating of the solution of the polymerizable liquid crystal composition of the invention, in order to form, on the support substrate after the coating, a polymerizable liquid crystal layer, i.e., a layer of the polymerizable liquid crystal composition, uniform in film thickness, a heat treatment may be performed. The heat treatment can utilize a hot plate, or a drying oven, or blowing of warm wind or hot wind, etc.

Preferred ranges of temperature and time of the heat treatment on the coating film, wavelength of light used for the light irradiation, and amount of light irradiated from a light source, etc. vary according to the types and composition ratios of compounds used in the polymerizable liquid crystal composition, and whether or not a photopolymerization initiator is added or the amount added, etc. Therefore, the conditions explained below with regard to the temperature and time of the heat treatment on the coating film, the wavelength of light used for the light irradiation, and the amount of light irradiated from the light source only indicate approximate ranges.

The heat treatment on the coating film is preferably performed under conditions that uniform alignment of polymerizable liquid crystals is obtained. The heat treatment may be performed at a temperature equal to or higher than the liquid crystal phase transition point of the polymerizable liquid crystal composition. One example of a heat treatment method is a method of heating the coating film to a temperature at which the polymerizable liquid crystal composition exhibits a nematic liquid crystal phase so that the polymerizable liquid crystal composition in the coating film forms nematic alignment. The nematic alignment may be formed by changing the temperature of the coating film within a temperature range at which the polymerizable liquid crystal composition exhibits the nematic liquid crystal phase. In this method, the coating film is heated to a high-temperature region within the above temperature range, by which the nematic alignment is substantially completed in the coating film, and then the temperature is decreased to obtain an alignment with higher regularity. When either of the above heat treatment methods is used, the heat treatment temperature is from room temperature to 120° C., preferably from room temperature to 80° C., and more preferably from room temperature to 60° C. The heat treatment time is 5 seconds to 2 hours, preferably 10 seconds to 40 minutes, and more preferably 20 seconds to 20 minutes. The heat treatment time is preferably 5 seconds or more in order to increase the temperature of the layer formed of the polymerizable liquid crystal composition to a predetermined temperature; the heat treatment time is preferably 2 hours or less in order to prevent decrease in the productivity. In this manner, the polymerizable liquid crystal layer is obtained.

The alignment state of the polymerizable liquid crystal compound formed in the polymerizable liquid crystal layer is fixed by polymerizing the polymerizable liquid crystal composition by light irradiation. The wavelength of the light used for the light irradiation is not particularly limited, and an electron beam, a UV ray, a visible ray, an infrared ray (heat ray), etc. can be utilized. Generally, a UV ray or a visible ray may be used. The wavelength ranges from 150 to 500 nm, preferably ranges from 250 to 450 nm, and more preferably ranges from 300 to 400 nm. Examples of the light source include a low-pressure mercury lamp (e.g., a bactericidal lamp, a fluorescent chemical lamp, and a black-light lamp), a high-pressure discharge lamp (e.g., a high-pressure mercury lamp, and a metal halide lamp), and a short arc discharge lamp (e.g., an ultra-high-pressure mercury lamp, a xenon lamp, and a mercury xenon lamp). Preferred examples of the light source include a metal halide lamp or a xenon lamp, an ultra-high-pressure mercury lamp and a high-pressure mercury lamp. The wavelength range of the light source for irradiation may be selected by installing a filter or the like between the light source and the polymerizable liquid crystal layer and allowing only a specific wavelength range to pass. The amount of light irradiated from the light source when the light reaches a coating film surface is 2 to 5000 mJ/cm$^2$, preferably 10 to 3000 mJ/cm$^2$, and more preferably 100 to 2000 mJ/cm$^2$. The temperature condition during the light irradiation is preferably set similarly to the above heat treatment temperature. In addition, an atmosphere of a polymerization environment may be any of a nitrogen atmosphere, an inert gas atmosphere and an air atmosphere, wherein a nitrogen atmosphere or an inert gas atmosphere is preferred in view of enhancing the curability.

When the polymerizable liquid crystal composition of the invention and the optically anisotropic body obtained by polymerizing the same by light or heat, etc. are used in various optical devices, or when they are applied as an optical compensation device used in an LCD apparatus, it is very important to control distribution of the tilt angle in a thickness direction.

One of the methods of controlling the tilt angle is adjusting the species or composition ratio, etc. of the polymerizable liquid crystal compound used in the polymerizable liquid crystal composition. The tilt angle can also be controlled by adding other components to the polymerizable liquid crystal composition. The tilt angle of the liquid crystal film can also be controlled based on the species of the solvent or the solute concentration in the polymerizable liquid crystal composition, and the species or the addition amount of the surfactant added as one of the other components, etc. The tilt angle of the liquid crystal film can also be controlled according to the species or rubbing condition of the support substrate or the polymer coating film, and the drying condition or heat treatment condition of the coating film of the polymerizable liquid crystal composition, etc. Furthermore, an irradiation atmosphere in the photo-polymerization step after alignment or the temperature during irradiation, etc. also affect the tilt angle of the liquid crystal film. That is, it may be considered that substantially all the conditions in a production process of the liquid crystal film influence the tilt angle in any way. Therefore, an arbitrary tilt angle can be provided by suitably selecting the conditions in the production process of the liquid crystal film, in addition to optimization of the polymerizable liquid crystal composition.

In the homogeneous alignment, the tilt angle is distributed around 0°, particularly from 0° to 5°, uniformly from a substrate interface to a free interface. This alignment state is obtained by coating the polymerizable liquid crystal composition of the invention on the surface of the support substrate that has undergone a surface treatment such as rubbing, etc. and forming the coating film.

An optically active compound, i.e., a compound having optical activity, may be added to the polymerizable liquid crystal composition of the invention. Suitable examples thereof include compounds represented by formulae (Op-1) to (Op-25), wherein Ak represents alkyl having 1 to 15 carbons or alkoxy having 1 to 15 carbons, and Me, Et and Ph represent methyl, ethyl and phenyl, respectively. $P^2$ is a polymerizable group, and is preferably a group containing (meth)acryloyloxy, vinyloxy, oxiranyl, or oxetanyl. The polymerizable liquid crystal composition of the invention may be used as, in addition to a raw material of a polymer as explained below, a liquid crystal being a component of an LCD device.

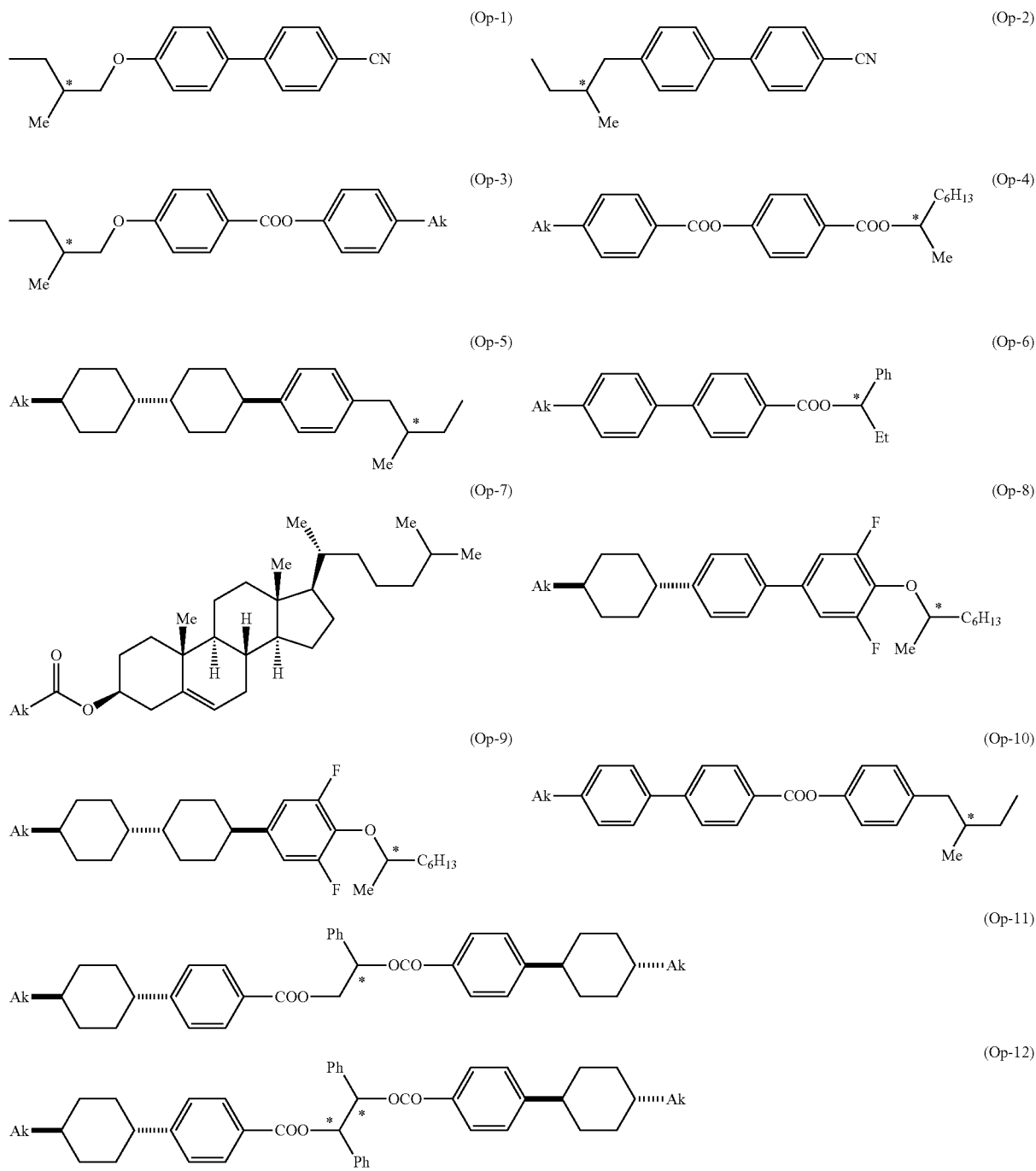

-continued
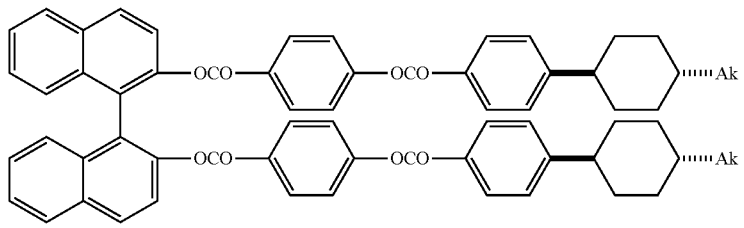
(Op-13)
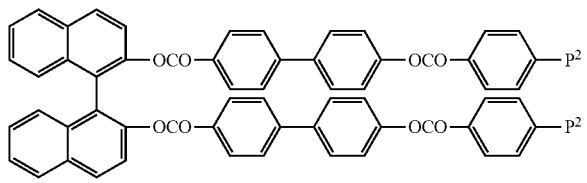
(Op-14)
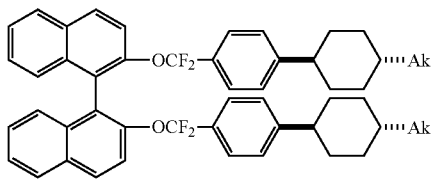
(Op-15)
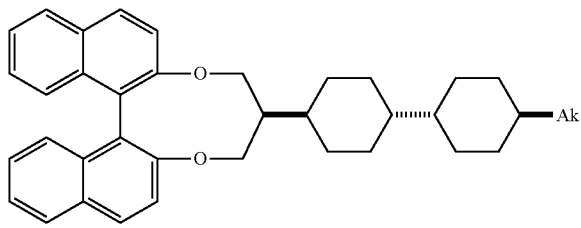
(Op-16)
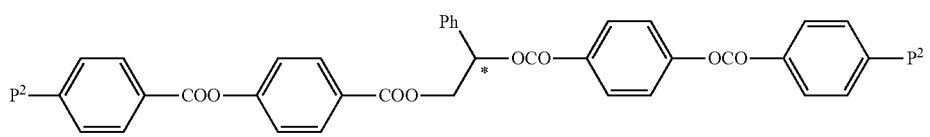
(Op-17)
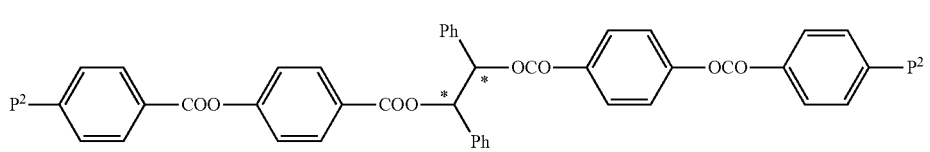
(Op-18)
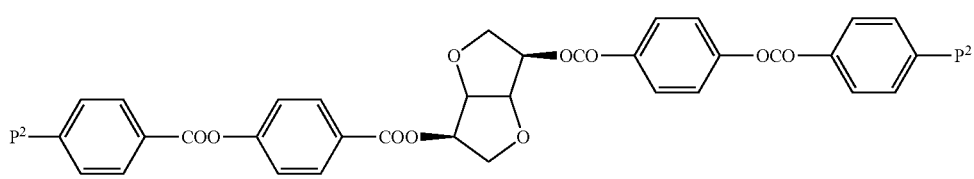
(Op-19)
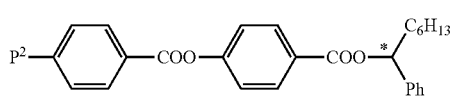
(Op-20)
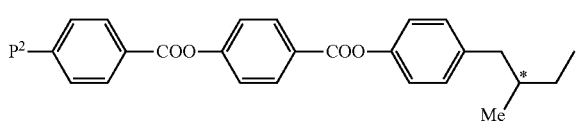
(Op-21)
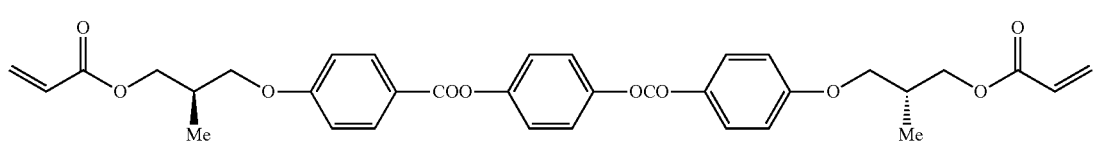
(Op-22)

-continued (Op-23)

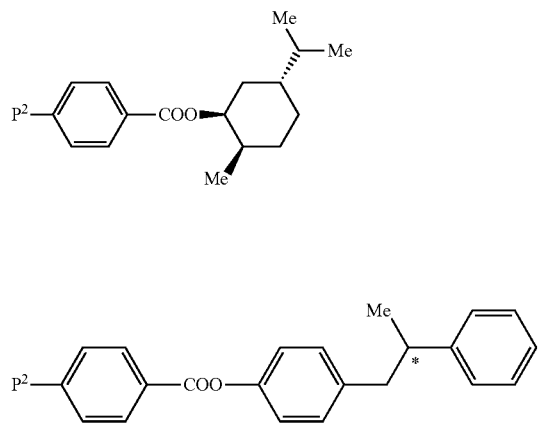

(Op-24)

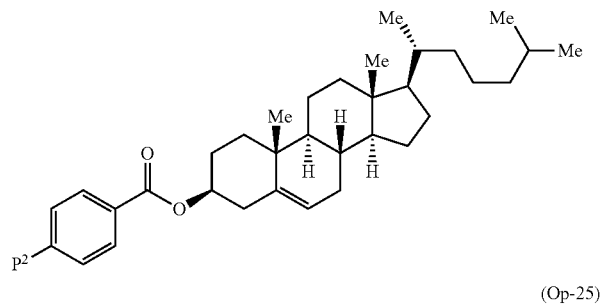

(Op-25)

Specific examples of the optically active compound include those described in paragraphs [0159] to [0170] in JP 2011-148762 A.

A phase difference film exhibiting a helical structure (twist structure) is obtained by coating the polymerizable liquid crystal composition containing a suitable amount of the optically active compound, or the polymerizable liquid crystal composition containing a suitable amount of a polymerizable compound that has optical activity, onto the substrate that has undergone an alignment treatment and then polymerizing the same. By polymerization of the polymerizable liquid crystal composition, this helical structure is fixed. Characteristics of the obtained liquid crystal film depend on the helical pitch of the obtained helical structure. The length of this helical pitch can be adjusted with the species and addition amount of the optically active compound. One optically active compound may be added, or a plurality of optically active compounds may be added for canceling out temperature dependency of the helical pitch. Moreover, the polymerizable liquid crystal composition may contain, in addition to the optically active compound, the other polymerizable compounds.

In selective reflection of visible light, which is a characteristic of the liquid crystal film as described above, the helical structure acts on incident light to reflect circularly polarized light or elliptically polarized light. Because the selective reflection characteristic is expressed as λ=n·Pitch (wherein λ represents the center wavelength of the selective reflection, n represents the in-plane average refractive index, and Pitch represents the helical pitch), by changing n or Pitch, the center wavelength (λ) and the wavelength width (Δλ) can be suitably adjusted. To improve the color purity, Δλ may be decreased; if broadband reflection is desired, Δλ may be increased. Furthermore, the selective reflection is also considerably influenced by the thickness of the polymer. In order to maintain the color purity, the thickness must be prevented from becoming too small. In order to maintain uniform alignment, the thickness must be prevented from becoming too large. Accordingly, moderate thickness adjustment is necessary, and the thickness is preferably 0.5 to 25 μm, more preferably 1 to 10 μm.

By shortening the helical pitch to shorter than visible light, a negative C-plate described in W. H. de Jeu, Physical Properties of Liquid Crystalline Materials, Gordon and Breach, New York (1980) can be prepared. In order to shorten the helical pitch, an optically active compound having large helical twisting power (HTP) can be used, and the amount added can further be increased. Specifically, the negative C-plate can be prepared by setting 2 to 350 nm or less, preferably 200 nm or less. The negative C-plate is an optical compensation film suitable for, among the LCD devices, VAN-type, VAC-type and OCB-type display devices, etc.

By increasing the helical pitch to longer than visible light, the liquid crystal film can be used for a reflection film of which a reflection wavelength range is set to near-infrared (wavelength of 800 to 2500 nm) as described in JP 2004-333671. In order to increase the helical pitch, for example, an optically active compound having a small helical twisting power can be used or the amount of the optically active compound added can be decreased.

The optically active compound may be any optically active compound as long as it is capable of inducing a helical structure and being suitably mixed with the polymerizable liquid crystal composition as a base. In addition, the optically active compound may be either a polymerizable compound or a non-polymerizable compound, and the optimum compound for the purpose can be added. In view of heat resistance and solvent resistance, a polymerizable compound is preferred.

Furthermore, among the aforementioned optically active compounds, those having a large helical twisting power (HTP) are suitable for shortening the helical pitch. Representative examples of the compound having a large HTP are disclosed in GB 2298202 and DE 10221751.

With regard to the thickness (film thickness) of the optically anisotropic body, a suitable thickness varies depending on the retardation or birefringence (value of optical anisotropy) of the optically anisotropic body according to a target device. Accordingly, although the thickness range differs for each purpose, an approximate range is 0.05 to 100 μm. A preferred range is 0.1 to 50 μm, and a more preferred range is 0.5 to 20 μm. A preferred haze value of the liquid crystal film is 1.5% or less, and a preferred transmittance thereof is 80% or more. A more preferred haze value is 1.0% or less, and a more preferred transmittance is 95% or more. The transmittance in the visible light region preferably satisfies these conditions.

The higher the birefringence (value of optical anisotropy) of the optically anisotropic body, the more the thickness can be reduced. As the thickness is reduced, the optical characteristics such as the haze value or the transmittance, etc. tend to be improved.

The optically anisotropic body is effective as an optical compensation device suitable for LCD devices (particularly active matrix LCD and passive matrix LCD). Examples of types of the LCD devices suitable for using the liquid crystal film as the optical compensation film include in-plane switching (IPS), optically compensated birefringence (OCB), twisted nematic (TN), super twisted nematic (STN), electrically controlled birefringence (ECB), deformation of aligned phases (DAP), color super homeotropic (CSH), vertically aligned nematic/vertically aligned cholesteric (VAN/VAC), optical mode interference (OMI), and super birefringence effect (SBE), etc. Furthermore, the liquid crystal film can also be used as a phase retarder for a display device of a guest-host type, a ferroelectric type, or an anti-ferroelectric type, etc. Moreover, since optimum values of parameters such as the distribution of the tilted angle in the thickness direction or the thickness, etc. required for the liquid crystal film strongly depend on the type of the LCD device to be compensated and optical parameters thereof, the optimum values vary according to the type of the device.

The optically anisotropic body can also be used as an optical device integrated with a polarizing plate or the like, and in this case, the optically anisotropic body is arranged outside a liquid crystal cell. On the other hand, due to no elution or only a small amount of elution of impurities to a liquid crystal filled in the cell, the optically anisotropic body as the optical compensation device can also be arranged inside the liquid crystal cell. For example, if the method disclosed in JP2008-0019434A is applied, the polymerizable liquid crystal layer of the invention is formed on a color filter, so that functions of the color filter can be further enhanced. In addition, the type of the polarizing plate used in the optical device to which the optically anisotropic body is applicable is not particularly limited. The optically anisotropic body can be suitably used for optical compensation for, of course, a widely utilized absorption type polarizing plate into which iodine is doped, and also for a reflection type polarizing plate such as a wire grid polarizing plate or the like.

The liquid crystal film may contain an additive, such as a dichroic dye. The dichroic dye preferably contains anthraquinone, naphthoquinone or azobenzene. A liquid crystal film having homogeneous alignment and composited with the dichroic dye can also be used as the absorption-type polarizing plate. Or, a liquid crystal film having homogeneous alignment and composited with a fluorescent dye may be used as a polarized light-emitting film.

EXAMPLES

The invention is hereinafter further explained in detail based on examples. The materials, amount being used, ratios, details of treatment, and processing steps, etc. shown in the following examples can be suitably changed without departing from the gist of the invention. Therefore, the scope of the invention is not limited to the specific examples shown below.

[Evaluation of Solubility]

A polymerizable liquid crystal composition was prepared by a later-described method, followed by dissolving a polymerizable liquid crystal compound in a hot bath at 40° C. After that, the resultant was stored at room temperature (25° C., 50% rh) for 24 hours, and whether any precipitate formed was visually confirmed.

o: No precipitate formed, and the solution remained homogeneous.
x: Some precipitates were confirmed to exist.

[Polymerization Conditions]

In an air atmosphere, irradiation with light having an intensity of 90 mW/cm$^2$ (365 nm) was performed using a 500 W ultra-high-pressure mercury lamp (made by Ushio Inc.) at room temperature (25° C., 50% rh) for 5.6 seconds.

[Production of Sample for Evaluating Coating Properties and Alignment Properties]

(1) Fabrication of Rubbing-Treated Glass Substrate with Alignment Film

Polyamic acid (Lixon Aligner PIA-5310 produced by JNC Corporation) for low pretilt angle (horizontally-aligned mode) was spin-coated on a glass substrate having a thickness of 1.1 mm, and the solvent was removed from the spin-coated film on a hot plate at 80° C. Then, the resultant obtained by burning the coating film in an oven at 230° C. for 30 minutes was rubbing-treated utilizing a rayon cloth. The spin-coating conditions were set so as to obtain a film thickness of 100 nm.

(2) Fabrication of Photo-Alignment-Treated Glass Substrate with Alignment Film

A cinnamic acid ester polymer (Lixon Coat PLA-6500 by JNC Corporation) for photo-alignment treatment (horizontally-aligned mode) was spin-coated on a glass substrate having a thickness of 1.1 mm, and the solvent was removed from the spin-coated film on a hot plate at 80° C. Then, in an air atmosphere, irradiation with polarized UV in an intensity of 30 mW/cm$^2$ (365 nm) was performed using a 500 W ultra-high-pressure mercury lamp (made by Ushio Inc.) at room temperature (25° C., 50% rh) for 13.4 seconds. The spin-coating conditions were set so as to obtain a film thickness of 100 nm.

[Evaluation of Coating Properties]

(3) Visual Observation Method

A substrate having a phase difference film formed thereon was sandwiched between two polarizing plates arranged in crossed Nicols and was observed. The substrate was rotated in a horizontal plane, and a brightness state was confirmed. According to the brightness state, presence or absence of unevenness or cissing during coating and the presence or absence of alignment defects were confirmed.

o: No unevenness or cissing was visually observed.
x: Unevenness or cissing was visually observed.

[Evaluation of Alignment Properties]

(4) Observation Method by Means of Polarizing Microscope

The substrate having the phase difference film formed thereon was observed through a polarizing microscope, and the presence or absence of minute alignment defects was confirmed.

o: Not even minute alignment defects were observed.
x: Minute alignment defects (including alignment defects resulting from coating unevenness) were observed.

[Preparation of Composition (1) of Polymerizable Liquid Crystal Composition]

40 weight parts of a polymerizable liquid crystal compound of formula (M2-1-1), 50 weight parts of a polymerizable liquid crystal compound of formula (M2-1-2), 10 weight parts of a polymerizable liquid crystal compound of formula (M2-22-1), 5 weight parts of Irgacure 907 as a photopolymerization initiator, and 0.1 weight part of Polyflow No. 95 as a surfactant were respectively weighed, mixed with 1000 weight parts of a mixed solvent of propylene glycol diacetate/cyclopentanone (5/95), and heated at 40° C. for 1 hour. After that, the resultant was filtered with a 0.1 μm membrane filter to obtain a composition (1) of the polymerizable liquid crystal composition of the invention.

The structures of the polymerizable liquid crystal compounds used in the polymerizable liquid crystal composition are shown below.

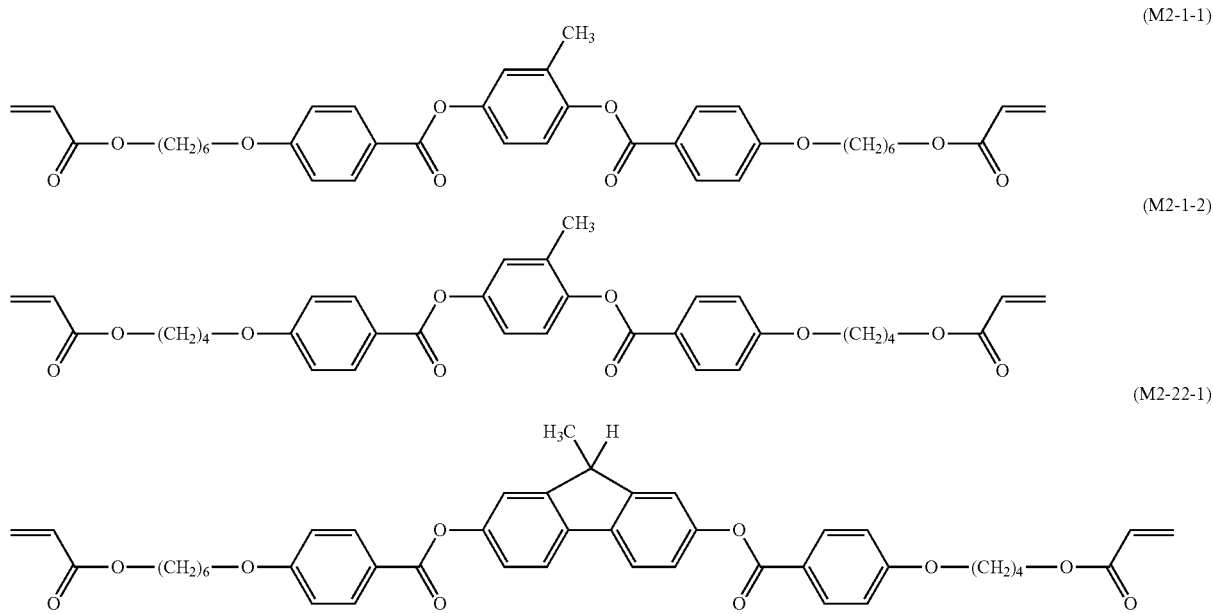

[Preparation of Compositions (2) to (18) of Polymerizable Liquid Crystal Composition]

Compositions (2) to (18) of the polymerizable liquid crystal composition of the invention were obtained in a similar manner as in the preparation of the composition (1) by changing only the amount of the solvent to the weight parts described in Table 1.

Example 1

The prepared composition (1) of the polymerizable liquid crystal composition was stored at room temperature (25° C., 50% rh) for 24 hours, and whether any precipitate formed was visually confirmed. As a result, no precipitate was confirmed and the solution remained homogeneous.

The prepared composition (1) of the polymerizable liquid crystal composition was spin-coated (1000 rpm, 15 sec) on a rubbing-treated glass substrate with an alignment film, followed by drying at 80° C. for 3 minutes. After that, the resultant was left to stand at room temperature (25° C., 50% rh) for 3 minutes, and was then irradiated with UV light having an intensity of 90 mW/cm$^2$ (365 nm) using a 500 W ultra-high-pressure mercury lamp (made by Ushio Inc.) at room temperature (25° C., 50% rh) for 5.6 seconds. The film thickness was 0.4 μm. The optically anisotropic body was observed by the visual observation method. As a result, no unevenness or cissing was observed. In addition, the optically anisotropic body was observed by the observation method by means of a polarizing microscope. As a result, not even minute alignment defects were observed.

Examples 2 to 12 and Comparative Examples 1 to 7

Results of the evaluation of solubility, the evaluation of coating properties, and the evaluation of alignment properties for the polymerizable liquid crystal compositions in Examples 2 to 12 and Comparative Examples 1 to 7 that were carried out in the same manner as in Example 1 are shown in Table 1.

TABLE 1

| | Solvent ratio (weight part) | | | | | | | | Results | | |
|---|---|---|---|---|---|---|---|---|---|---|---|
| | Diacetate solvent | | | Ketone solvent | | Monoacetate solvent | Ether solvent | Hydrocarbon solvent | | | |
| | | 1,4- | 1,3- | | | | | | | Alignment | Coating |
| | PGDA | BDDA | BGDA | MEK | CPN | PGMEA | EDM | TL | Solubility | properties | properties |
| Example | | | | | | | | | | | |
| 1 (Composition 1) | 5 | | | | 95 | | | | ○ | ○ | ○ |
| 2 (Composition 2) | 10 | | | | 90 | | | | ○ | ○ | ○ |
| 3 (Composition 3) | 20 | | | | 80 | | | | ○ | ○ | ○ |
| 4 (Composition 4) | 30 | | | | 70 | | | | ○ | ○ | ○ |
| 5 (Composition 5) | 40 | | | | 60 | | | | ○ | ○ | ○ |
| 6 (Composition 6) | 50 | | | | 50 | | | | ○ | ○ | ○ |
| 7 (Composition 7) | 20 | | | | 50 | 30 | | | ○ | ○ | ○ |
| 8 (Composition 8) | 20 | | | | 75 | | 5 | | ○ | ○ | ○ |

TABLE 1-continued

| | Solvent ratio (weight part) | | | | | | | | Results | | |
|---|---|---|---|---|---|---|---|---|---|---|---|
| | Diacetate solvent | | | Ketone solvent | | Monoacetate solvent | Ether solvent | Hydrocarbon solvent | | Alignment | Coating |
| | PGDA | 1,4-BDDA | 1,3-BGDA | MEK | CPN | PGMEA | EDM | TL | Solubility | properties | properties |
| 9 (Composition 9) | | 10 | | | 90 | | | | ○ | ○ | ○ |
| 11 (Composition 10) | | | 10 | | 90 | | | | ○ | ○ | ○ |
| 12 (Composition 11) | 10 | 10 | | | 80 | | | | ○ | ○ | ○ |
| Comparative Examples | | | | | | | | | | | |
| 1 (Composition 12) | 100 | | | | | | | | ○ | x | x |
| 2 (Composition 13) | | 100 | | | | | | | ○ | x | x |
| 3 (Composition 14) | | | 100 | | | | | | ○ | ○ | x |
| 4 (Composition 15) | | | | | | 100 | | | ○ | ○ | x |
| 5 (Composition 16) | | | | | | | 100 | | ○ | x | x |
| 6 (Composition 17) | | | | | 30 | 70 | | | ○ | ○ | x |
| 7 (Composition 18) | | | | | 70 | 30 | | | ○ | ○ | x |

20 weight parts of a polymerizable liquid crystal compound of formula (M2-1-1), 30 weight parts of a polymerizable liquid crystal compound of formula (M2-22-1), 50 weight parts of a polymerizable liquid crystal compound of formula (M1-2-1), 5 weight parts of Irgacure 907 as a photopolymerization initiator, and 0.1 weight part of Polyflow No. 95 as a surfactant were respectively weighed, mixed with 500 weight parts of a mixed solvent of propylene glycol diacetate/cyclopentanone (5/95), and heated at 40° C. for 1 hour. After that, the resultant was filtered with a 0.1 μm membrane filter to obtain a composition (19) of the polymerizable liquid crystal composition of the invention.

The structures of the polymerizable liquid crystal compounds used in the polymerizable liquid crystal composition are shown below.

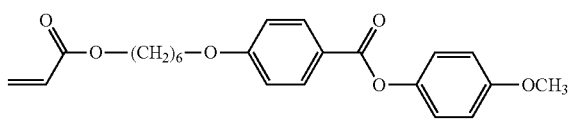

(M1-2-1)

[Preparation of Compositions 20 to 28 of Polymerizable Liquid Crystal Composition]

Compositions 20 to 28 of the polymerizable liquid crystal composition of the invention were obtained in the same manner as in the preparation of the composition 19 by changing only the amount of the solvent to the weight parts described in Table 2.

The prepared composition 19 of the polymerizable liquid crystal composition was spin-coated (1000 rpm, 15 sec) on a photo-alignment-treated glass substrate with an alignment film, followed by drying at 60° C. for 3 minutes. After that, the resultant was left to stand at room temperature (25° C., 50% rh) for 3 minutes, and was then irradiated with UV light having an intensity of 90 mW/cm² (365 nm) using a 500 W ultra-high-pressure mercury lamp (made by Ushio Inc.) at room temperature (25° C., 50% rh) for 5.6 seconds. The film thickness was 0.8 μm. The optically anisotropic body was observed by the visual observation method. As a result, no unevenness or cissing was observed. In addition, the optically anisotropic body was observed by the observation method by means of a polarizing microscope. As a result, not even minute alignment defects were observed.

Examples 20 to 26 and Comparative Examples 8 to 9

Results of the evaluation of solubility, the evaluation of coating properties, and the evaluation of alignment properties for the polymerizable liquid crystal compositions in Examples 20 to 26 and Comparative Examples 8 to 9 that were carried out in the same manner as in Example 19 are shown in Table 2.

TABLE 2

| | Solvent ratio (weight part) | | | | | | | | Results | | |
|---|---|---|---|---|---|---|---|---|---|---|---|
| | Diacetate solvent | | | Ketone solvent | | Monoacetate solvent | Ether solvent | Hydrocarbon solvent | | Alignment | Coating |
| | PGDA | 1,4-BDDA | 1,3-BGDA | MEK | CPN | PGMEA | EDM | TL | Solubility | properties | properties |
| Example | | | | | | | | | | | |
| 19 (Composition 19) | 10 | | | | 90 | | | | ○ | ○ | ○ |
| 20 (Composition 20) | 30 | | | | 70 | | | | ○ | ○ | ○ |
| 21 (Composition 21) | | 20 | | | 80 | | | | ○ | ○ | ○ |
| 22 (Composition 22) | | | 20 | | 80 | | | | ○ | ○ | ○ |
| 23 (Composition 23) | 50 | | | | 50 | | | | ○ | ○ | ○ |
| 24 (Composition 24) | 60 | | | | 40 | | | | ○ | ○ | ○ |

TABLE 2-continued

| | Solvent ratio (weight part) | | | | | | | | Results | | |
|---|---|---|---|---|---|---|---|---|---|---|---|
| | Diacetate solvent | | | Ketone solvent | | Monoacetate solvent | Ether solvent | Hydrocarbon solvent | | Alignment | Coating |
| | PGDA | 1,4-BDDA | 1,3-BGDA | MEK | CPN | PGMEA | EDM | TL | Solubility | properties | properties |
| 25 (Composition 25) | 20 | | | | 50 | 30 | | | ○ | ○ | ○ |
| 26 (Composition 26) | 10 | | | | 80 | | | 10 | ○ | ○ | ○ |
| Comparative Examples | | | | | | | | | | | |
| 8 (Composition 27) | | | | 100 | | | | | ○ | ○ | x |
| 9 (Composition 28) | | | | | 100 | | | | ○ | x | x |

The solvents used in Examples and Comparative Examples are shown below.

[Diacetate Solvent]
PGDA: propylene glycol diacetate
1,4-BDDA: 1,4-butanediol diacetate
1,3-BGDA: 1,3-butylene glycol diacetate

[Ketone Solvent]
MEK: methyl ethyl ketone
CPN: cyclopentanone

[Monoacetate Solvent]
PGMEA: propylene glycol monomethyl ether acetate

[Ether Solvent]
EDM: diethylene glycol methyl ethyl ether

[Hydrocarbon Solvent]
TL: Toluene

It is clear from the results of Examples and Comparative Examples that all of the polymerizable liquid crystal compositions of the invention exhibit good solubility, coating properties and alignment properties.

INDUSTRIAL APPLICABILITY

The polymerizable liquid crystal composition of the invention has good solubility with regard to a polymerizable liquid crystal compound, and causes no cissing or unevenness during coating thereof. By polymerizing the polymerizable liquid crystal composition, a well-aligned optically anisotropic body can be easily obtained.

What is claimed is:

1. A polymerizable liquid crystal composition, containing at least one kind of polymerizable liquid crystal compound having one or more polymerizable functional groups in one molecule, and a solvent, wherein the solvent comprises a diacetate solvent and a ketone solvent.

2. The polymerizable liquid crystal composition of claim 1, wherein the diacetate solvent is contained in an amount of 1 wt % to 75 wt % relative to a total amount of the solvent.

3. The polymerizable liquid crystal composition of claim 1, wherein the diacetate solvent comprises at least one selected from the group consisting of propylene glycol diacetate, 1,4-butanediol diacetate and 1,3-butylene glycol diacetate.

4. The polymerizable liquid crystal composition of claim 3, wherein the diacetate solvent comprises at least one selected from the group consisting of propylene glycol diacetate and 1,4-butanediol diacetate.

5. The polymerizable liquid crystal composition of claim 1, wherein the ketone solvent is contained in an amount of 50 wt % to 95 wt % relative to a total amount of the solvent.

6. The polymerizable liquid crystal composition of claim 1, wherein the ketone solvent comprises cyclopentanone.

7. The polymerizable liquid crystal composition of claim 1, further containing a monoacetate solvent in an amount of 30 wt % or less relative to a total amount of the solvent.

8. The polymerizable liquid crystal composition of claim 7, wherein the monoacetate solvent comprises propylene glycol methyl ether acetate.

9. The polymerizable liquid crystal composition of claim 1, further containing an ether solvent in an amount of 10 wt % or less relative to a total amount of the solvent.

10. The polymerizable liquid crystal composition of claim 9, wherein the ether solvent comprises diethylene glycol methyl ethyl ether.

11. The polymerizable liquid crystal composition of claim 1, further containing a solvent other than the diacetate solvent, the ketone solvent, a monoacetate solvent and an ether solvent, in an amount of 5 wt % or less relative to a total amount of the solvent in the polymerizable liquid crystal composition.

12. The polymerizable liquid crystal composition of claim 11, wherein a total content of an alcohol solvent and a hydrocarbon solvent is 5 wt % or less relative to the total amount of the solvent in the polymerizable liquid crystal composition.

13. An optically anisotropic body obtained by curing the polymerizable liquid crystal composition of claim 1 in an aligned state.

14. An optically anisotropic body obtained by curing the polymerizable liquid crystal composition of claim 1 in a horizontally aligned state.

15. An optically anisotropic body obtained by curing the polymerizable liquid crystal composition of claim 1 in a twistedly aligned state.

16. An optically anisotropic body obtained by curing the polymerizable liquid crystal composition of claim 1 in a vertically aligned state.

17. A laminated optically anisotropic body obtained by laminating a plurality of the optically anisotropic body of claim 13.

18. A laminated optically anisotropic body obtained by laminating a plurality of the optically anisotropic body of claim 14.

19. A laminated optically anisotropic body obtained by laminating a plurality of the optically anisotropic body of claim 15.

20. A laminated optically anisotropic body obtained by laminating a plurality of the optically anisotropic body of claim 16.

* * * * *